US012731319B2

(12) United States Patent
Bharaj et al.

(10) Patent No.: US 12,731,319 B2
(45) Date of Patent: Sep. 8, 2026

(54) GENERATING FACIAL REPRESENTATIONS

(71) Applicant: Flawless Holdings Limited, London (GB)

(72) Inventors: Gaurav Bharaj, Santa Monica, CA (US); Qingju Liu, London (GB)

(73) Assignee: Flawless Holdings Limited, London (GB)

(*) Notice: Subject to any disclaimer, the term of this patent is extended or adjusted under 35 U.S.C. 154(b) by 187 days.

(21) Appl. No.: 18/348,856

(22) Filed: Jul. 7, 2023

(65) Prior Publication Data

US 2025/0014253 A1 Jan. 9, 2025

(51) Int. Cl.
*G06T 13/40* (2011.01)
*G10L 15/06* (2013.01)

(52) U.S. Cl.
CPC ............ *G06T 13/40* (2013.01); *G10L 15/063* (2013.01)

(58) Field of Classification Search
CPC ....... G06T 13/40; G10L 15/063; G10L 21/10; G10L 2021/105
USPC .......................................................... 345/419
See application file for complete search history.

(56) References Cited

U.S. PATENT DOCUMENTS 9,548,048 B1 * 1/2017 Solh ....................... G06V 40/20
11,049,308 B2 * 6/2021 del Val Santos ....... G06N 3/088
11,238,885 B2 * 2/2022 Mittal ..................... G06T 17/20
11,398,255 B1 7/2022 Mann et al.
11,562,521 B2 * 1/2023 del Val Santos ..... G06N 3/0464
11,562,597 B1 1/2023 Kim
11,847,727 B2 * 12/2023 del Val Santos ..... G06N 3/0442
12,033,259 B2 * 7/2024 Kwatra ................. G06T 13/205
12,315,057 B2 * 5/2025 Beith ...................... G06V 40/20
12,322,018 B2 * 6/2025 Ume ...................... G06N 20/00
12,374,014 B2 * 7/2025 Starke ..................... G06T 13/40
12,406,419 B1 * 9/2025 Villanueva Aylagas ..................... G06T 13/40
2020/0135226 A1 4/2020 Mittal et al.
2020/0302667 A1 * 9/2020 del Val Santos ......... G06N 3/09
2021/0319610 A1 * 10/2021 del Val Santos ....... G06N 3/084
(Continued)

FOREIGN PATENT DOCUMENTS

WO 2023219752 A1 11/2023

OTHER PUBLICATIONS

Cong Gaoxiang et al.,: "Learning to Dub Movies via Hierarchical Prosody Models", 2023 IEEE/CVF Conference on Computer Vision and Pattern Recognition (CVPR), IEEE, pp. 14687-14697, XP034401043, Jun. 17, 2023.

(Continued)

*Primary Examiner* — Sheree N Brown
(74) *Attorney, Agent, or Firm* — EIP US LLP

(57) ABSTRACT

A method of generating facial representations using a machine learned model is provided. A text encoder generates a representation of an input text segment. An aligner determines a time alignment between the input text segment and an input audio signal. A decoder generates a facial representation based at least in part on the representation of the input text segment, the time alignment, and on target style data, the target style data representing a target audio style, wherein the facial representation comprises a sequence of facial expressions corresponding to the input text segment. A method of training such a machine learning model is also provided.

12 Claims, 13 Drawing Sheets

(56) References Cited

U.S. PATENT DOCUMENTS

| | | | | |
|---|---|---|---|---|
| 2023/0123486 | A1* | 4/2023 | del Val Santos | G06N 3/0475 345/473 |
| 2023/0154089 | A1* | 5/2023 | Bradley | G06T 9/002 345/474 |
| 2023/0154090 | A1* | 5/2023 | Bradley | G06N 3/045 345/419 |
| 2023/0335107 | A1* | 10/2023 | Zhao | G10L 15/16 |
| 2023/0394734 | A1* | 12/2023 | Marquis Bolduc | A63F 13/56 |
| 2024/0013462 | A1* | 1/2024 | Seol | G06T 13/205 |
| 2024/0037824 | A1* | 2/2024 | Biswas | G10L 15/22 |
| 2024/0038271 | A1* | 2/2024 | de Juan | G11B 27/031 |
| 2024/0212249 | A1* | 6/2024 | Ume | G06N 20/00 |
| 2024/0312095 | A1* | 9/2024 | Wei | G06N 3/09 |

OTHER PUBLICATIONS

International Search Report and Written Opinion dated Oct. 1, 2024 for International PCT Application No. PCT/GB2024/051777.

Daniel Cudeiro et al., "Capture, learning, and synthesis of 3d speaking styles", In Proceedings of the IEEE/CVF Conference on Computer Vision and Pattern Recognition, pp. 10101-10111, 2019, May 8, 2019.

Yingruo Fan et al., "Faceformer: Speech-driven 3d facial animation with transformers", In Proceedings of the IEEE/CVF Conference on Computer Vision and Pattern Recognition, pp. 18770-18780, Dec. 10, 2021.

Tero Karras et al., "Audio-driven facial animation by joint end-to-end learning of pose and emotion", ACM Transactions on Graphics (TOG), 36(4):1-12, Jul. 30, 2017.

K R Prajwal et al., "A lip sync expert is all you need for speech to lip generation in the wild", In Proceedings of the 28th ACM International Conference on Multimedia, pp. 484-492, 2020, Aug. 23, 2020.

Alexander Richard et al., "Meshtalk: 3d face animation from speech using cross-modality disentanglement", In Proceedings of the IEEE/CVF International Conference on Computer Vision, pp. 1173-1182, Apr. 16, 2021.

Yi Ren et al., "Fastspeech 2: Fast and high-quality end-to-end text to speech", arXiv preprint arXiv:2006.04558, Jun. 8, 2020.

Michael McAuliffe et al., "Montreal forced aligner: Trainable text-speech alignment using Kaldi", In Interspeech, vol. 2017, pp. 498-502, Aug. 20, 2017.

Dongchan Min et al., "Meta-stylespeech: Multi-speaker adaptive text-to-speech generation", In International Conference on Machine Learning, pp. 7748-7759. PMLR, Jun. 6, 2021.

Ralph Gross et al., "Multi-pie", Dec. 1, 2013.

Yinghao Aaron Li et al., "Styletts: A style-based generative model for natural and diverse text-to-speech synthesis", arXiv preprint arXiv:2205.15439, May 30, 2022.

Ashish Vaswani et al., "Attention is all you need", Advances in neural information processing systems, 30, Jun. 12, 2017.

Kun Zhou et al., "Emotional Voice Conversion: Theory, Databases and ESD", Speech Communication, 137:1-18, May 31, 2021.

Yuxuan Wang et al., "Style tokens: Unsupervised style modeling, control and transfer in end-to-end speech synthesis", arXiv:1803.09017, Mar. 23, 2018.

Kyubyong Park et al., "g2pE: A Simple Python Module for English Grapheme To Phoneme Conversion", https://github.com/Kyubyong/g2p, Dec. 31, 2019.

Daniel Jurafsky et al., "Speech and language processing" (3rd draft ed.), Oct. 16, 2019.

* cited by examiner (b) Angry

GENERATING FACIAL REPRESENTATIONS

BACKGROUND OF THE INVENTION

Field of the Invention

The present invention relates to generating representations of human faces, such as for facial animation. The invention has particular, but not exclusive, relevance to visual dubbing of feature films.

Description of the Related Technology

Representations or animations of a human face are required in a wide range of technologies, including telepresence, augmented reality (AR), virtual reality (VR), computer-generated imagery (CGI), visual language localization, and subject-performance editing for videos. A particular application of facial representations is in dubbing of foreign language versions of a film.

Traditional voice dubbing techniques replace the audio spoken by an actor with dubbed audio in the desired foreign language, without altering the film images. This yields an undesirable mismatch between the foreign language audio and the mouth movements of the original language actor. In recent years, methods have been proposed in which neural network models are used to render photo-realistic instances of the face of a target actor with expressions and mouth movements derived from footage of a foreign language actor, effectively enabling visual dubbing of foreign language films. Known approaches can include: (i) two-dimensional methods (commonly referred to as deep fakes) in which a generative adversarial network (GAN) or similar model is used to generate a visually dubbed output based directly on the footage of the source actor and target actor, and (ii) three-dimensional methods in which a three-dimensional model of the face of the target actor is modified using the source footage and then coupled to a neural renderer which renders a visually dubbed output based on the modified three-dimensional model (discussed in U.S. Pat. No. 11,398,255B1, which is incorporated herein by reference in its entirety for all purposes).

In general, it may be desirable to generate a facial representation based on an input audio signal. Such a facial representation should express the mouth movements involved in speaking words in the input audio signal. However, mouth movements of a speaker are not solely determined by the spoken words. The emotion of the speaker may also impact on the mouth movements of a speaker, and of more generally on the facial state of the speaker. It may therefore be desirable to generate a virtual representation of a face which conveys a desired emotion as well as expressing the spoken words of the input audio. Several audio-driven facial animation methods are known for generating animated 3D meshes, including an emotional aspect, directly from audio [1]-[4]. Early works, like Kerras et al. [3], use straightforward regression models to build a subject dependent model, that takes a short volume of linear predictive coefficients (LPC) features centered at the current frame and a learned latent emotional state to control face animation generation. However, the emotional states are not semantically meaningful. The VOCA method, Cudeiro et al. [1], takes a short segment of Deep-Speech features, and one hot speaker embedding, and design a stacked convolutional and fully connected layers architecture to regress the 3D mesh in FLAME [25] 3DMM. Although DeepSpeech features contain high-level discriminative audio features, it can suffer from information loss that is important for richer emotional articulations. Richard et al. [5] present a two-stage method with semantically-disentangled expressive categorical hidden vectors, where audio-correlated, and audio-uncorrelated expressions are learned with a cross-modal reconstruction loss that focuses on lower, and upper halves of the face, respectively. An auto-regressive network is then built to sample from the categorical hidden vectors from the audio signals to control the mesh decoder. FaceFormer [2] builds a multi-subjects pipeline with a typical auto-regressive encoder-decoder structure, where the encoder exploits a pretrained Wav2Vec2 network in a self-supervised learning setting, and transformer decoder that fine tunes biased attention. Unlike these works, we present an audio style disentanglement driven blendshape animation method, that provides style-driven articulation control, while regressing blendshapes, rather than vertex-based animations.

Although such techniques may generate a facial representation involving emotions, the control a user has over the presented emotions may be limited. For example, there may be limited scope for a user to tailor the expressed emotion of a facial representation. Moreover, training data for such techniques may be limited. Directly mapping spoken audio to facial movements of a speaker requires specialized face-tracking technology, which is both costly and time consuming to generate. Such limited training data may in turn limit the performance of the resulting model, and so limit the accuracy of generated facial representations.

SUMMARY

According to a first aspect, there is provided computer-implemented method of generating a facial representation, the method comprising receiving, at a machine learned model, an input text segment, an input audio signal corresponding to the input text segment, and a target style data, wherein the target style data represents a target audio style. The method further comprises generating, by a text encoder of the machine learned model, a representation of the input text segment; and determining, by an aligner of the machine learned model, a time alignment between the input text segment and the input audio signal; and generating, by a decoder of the machine learned model, the facial representation based at least in part on the representation of the input text segment, the time alignment, and the target style data, wherein the facial representation comprises a sequence of facial expressions corresponding to the input text segment.

Such a method may generate a facial representation which articulates the words of the input text segment and/or input audio, but with a different style or emotion compared to the speaker of the input audio. In other words, the method is able to disentangle style from content. In contrast to known methods of generating facial representations, the present method may allow control of the style of a generated facial representation. For example, where the facial representation is to be used for video dubbing a film, the style of the facial representation may be adapted to match the style of the original language actor, but appearing to speak words in a different language, maintaining the emotional appearance of the original language film. The facial representation may for example be a blendshape. The method may further comprise modifying a received video based on the generated facial representation.

In some embodiments, the method may further comprise receiving, at the machine learned model, a reference audio signal exhibiting the target audio style; and generating, by a style encoder of the machine learned model, the target style data based at least in part on the reference audio signal. For example, the reference audio signal may be spoken by a different person than the speaker of the input audio, and/or may be spoken in a different style to the input audio. In some examples, the reference audio signal may be the original audio of a video which is to be modified by the generated facial representation. When used for video dubbing, the reference audio signal may be audio spoken by the original language actor, whose face is to be modified in the video to appear to speak a foreign language. Such embodiments may allow a facial representation to be automatically generated which mirrors the style of the reference audio. Alternatively, or additionally, the target style data may be generated by a user, for example based on user inputs indicating a desired style or one or more elements of a desired style for the facial representation.

In some embodiments, the method may further comprise training the machine learned model, wherein training the machine learned model comprises a first training operation and a second training operation. The first training operation may comprise training the model based at least in part on: generating, by a first configuration of the decoder, an output audio representation based on a first training data segment and a corresponding first training audio signal; and updating the machine learning model so as to reduce a deviation between the output audio representation and an audio representation of the first training audio signal. The second training operation may comprise training the model based at least in part on: generating, by a second configuration of the decoder, an output facial representation based at least in part on a second training data segment and a corresponding second training audio signal; and updating the machine learning model so as to reduce a deviation between the output facial representation and a training facial representation corresponding to the second training text segment and second training audio signal.

Training the machine learned model may thus comprise a two-stage training approach. The first stage generates an audio representation, such as a Mel-spectrogram, from the input audio and input text segment. The first stage may in effect be considered a style-aware text-to-speech process, converting the input text segment into an audio signal. Advantageously, there is a large amount of training data available for text-to-speech which can be utilized in the first stage training. Unlike facial representation training data, generating text-to-speech training data does not require specialized equipment to map a facial movements of a speaker. Once the model has been trained for audio generation, the model is adapted to generate a facial representation as the output instead of an audio representation. The second stage may thus act as a refinement of the training already done in the first stage. As a refinement stage, less training data is needed to yield accurate results. Thus, the two-stage training method may generate accurate facial representations even though facial representation training data is limited.

In some embodiments, generating the time alignment may comprise determining, from the input audio signal, a ground truth duration of phonemes represented in the input text segment, and wherein the facial representation is generated based at least in part on the ground truth duration of the phonemes.

Conventionally, phoneme duration may be considered entangled with style-information, and so it may be expected that leaving phoneme duration as a variable to be predicted by the machine learned model would improve control of the style of the generated facial representation. However, the present inventors have realized that for audio-driven facial animation, a variable phoneme duration may allow the audio to become noticeably out-of-sync with the generate facial representation. Accordingly, the present method may fix the phoneme to the ground truth duration by automatically determining the ground truth duration from a comparison of the input text segment and the input audio. In this way, out-of-sync problems may be avoided or limited, for example providing an improved viewing experience for a viewer watching a video modified by the generated facial representation.

In some embodiments, the target style data may be an embedded representation of the target audio style. The method may further comprise predicting, from the target style data, an energy parameter (relating to energy), a pitch parameter (relating to pitch), and a residual parameter (relating to a style residual). Alternatively, the target style data may specify an energy parameter, a pitch parameter, and a residual parameter, for example based on user input. Style is often considered to be defined by energy and pitch, which are effectively physical properties of the audio. However, by including an additional residual term in the style, the present method may allow additional information, that would normally be discarded, to be captured and reflected in the facial representation, yielding improved facial representations. Including the residual parameter is particularly beneficial for the two-stage training approach discussed above. Weights associated with energy and pitch may be fixed at the end of the first, audio-based training operation. Weights associated with the residual parameter may be further optimized in the second training operation, allowing additional information reflected in the training facial representations, but not in the audio signal, to be reflected in the model.

According to a second aspect, there is provided a computer-implemented method of training a machine learning model for generating a facial representation, the method comprising: initializing the machine learning model, wherein the machine learning model comprises: a text encoder configured to generate, from a received text segment, a representation of the received text segment; an aligner configured to determine a time alignment between the received text segment and a received audio signal corresponding to the received text segment; and a decoder configured to generate an output based at least in part on the representation of the received text segment, the time alignment, and a received target style data representing an audio style. The method further comprises performing a first training operation comprising training the machine learning model based at least in part on: generating, by a first configuration of the decoder, an output audio representation based on a first training data segment and a corresponding first training audio signal; and updating the machine learning model so as to reduce a deviation between the output audio representation and an audio representation of the first training audio signal. The method further comprises performing a second training operation comprising training the model based at least in part on: generating, by a second configuration of the decoder, an output facial representation based at least in part on a second training data segment and a corresponding second training audio signal; and updating the machine learning model so as to reduce a deviation between the output facial representation and a training facial representation corresponding to the second training text segment and second training audio signal; and outputting, based at least in part on the first training operation and the second training operation, a machine learned model, wherein the machine learned model comprises the decoder in the second configuration.

According to a third aspect there is provided a computing system comprising means to carry out the method of any of embodiment of the first aspect or the second aspect.

According to a fourth aspect there is provided one or more storage media storing machine readable instructions which, when executed by one or more processors, cause the one or more processors to carry out the method of any of embodiment of the first aspect or the second aspect.

According to a fifth aspect there is provided a computer program comprising instructions which, when executed by a computer, cause the computer to perform the method of any of embodiment of the first aspect or the second aspect.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the case of explanation and understanding of the concepts underlying the examples.

Figure 1:
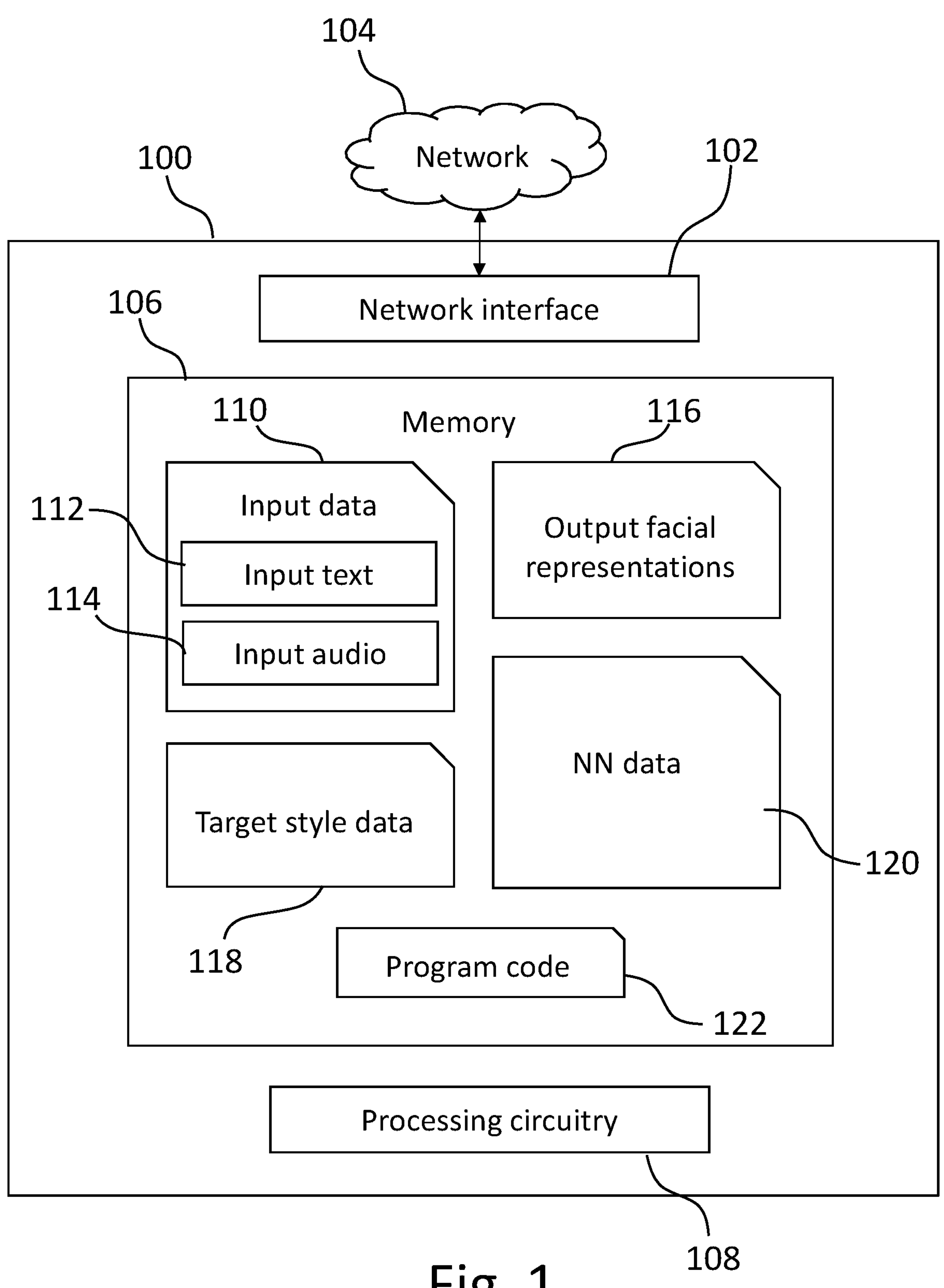
FIG. 1 is a block diagram that shows schematically a data processing system arranged in accordance with examples.

FIG. 1 schematically shows a data processing system 100 in accordance with examples. The data processing system 100 includes a network interface 102 for communicating with remote devices over a network 104. The data processing system 100 may be a single device such as a server computer or may include multiple devices, for example multiple server computers connected via a network. The data processing system 100 includes memory 106, which in the present disclosure refers both to non-volatile storage and to volatile and non-volatile working memory. The memory 106 is communicatively coupled to processing circuitry 108, which may include any number of processing units such as central processing units (CPUs), graphics processing units (GPUs), neural processing units (NPUs) or neural network accelerators (NNAs), application specific integrated circuits (ASICs), digital signal processors (DSPs), and so on.

The memory 106 is arranged to store various types of data for implementing the methods described herein. In particular, the memory 106 may store input data 110 comprising input text segments 112 and input audio 114 corresponding to the input text segments 112. For example, an input text segment 112 may be a transcript of words spoken in an input audio 114 recording. Input audio 114 may be associated with a video file, such as being a soundtrack of a film recording. Memory 106 may further store target style data 118. Target style data may define a desired style or emotion to be represented in the generated facial representation. The memory may further be arranged to store output facial representations 116. An output facial representation 116 may be a facial representation, such as a blend shape, generated by the models and methods described below.

The memory 106 further stores neural network data 120 corresponding to one or more neural network models, including but not limited to one or more models for implementing methods as described herein. The neural network data 120 may define all aspects of the neural network models required for training and/or subsequent processing of data by the neural network models. The neural network data 120 may for example encode network architectures, hyperparameter values, trainable parameter values, training routines, definitions of training objectives, and so on. The neural network data 120 may specify trained weights associated with the neural network. Details of neural network models for implementing methods in accordance with the present disclosure are provided in detail below.

The memory 106 may further store program code 122 comprising routines for implementing the computer-implemented methods described herein. The routines may enable completely automated implementations of the computer-implemented methods, and/or may enable user input to control various aspects of the processing. The program code 122 may for example define a software tool to enable users to control a style represented in a generated facial representation.

Figure 2A:
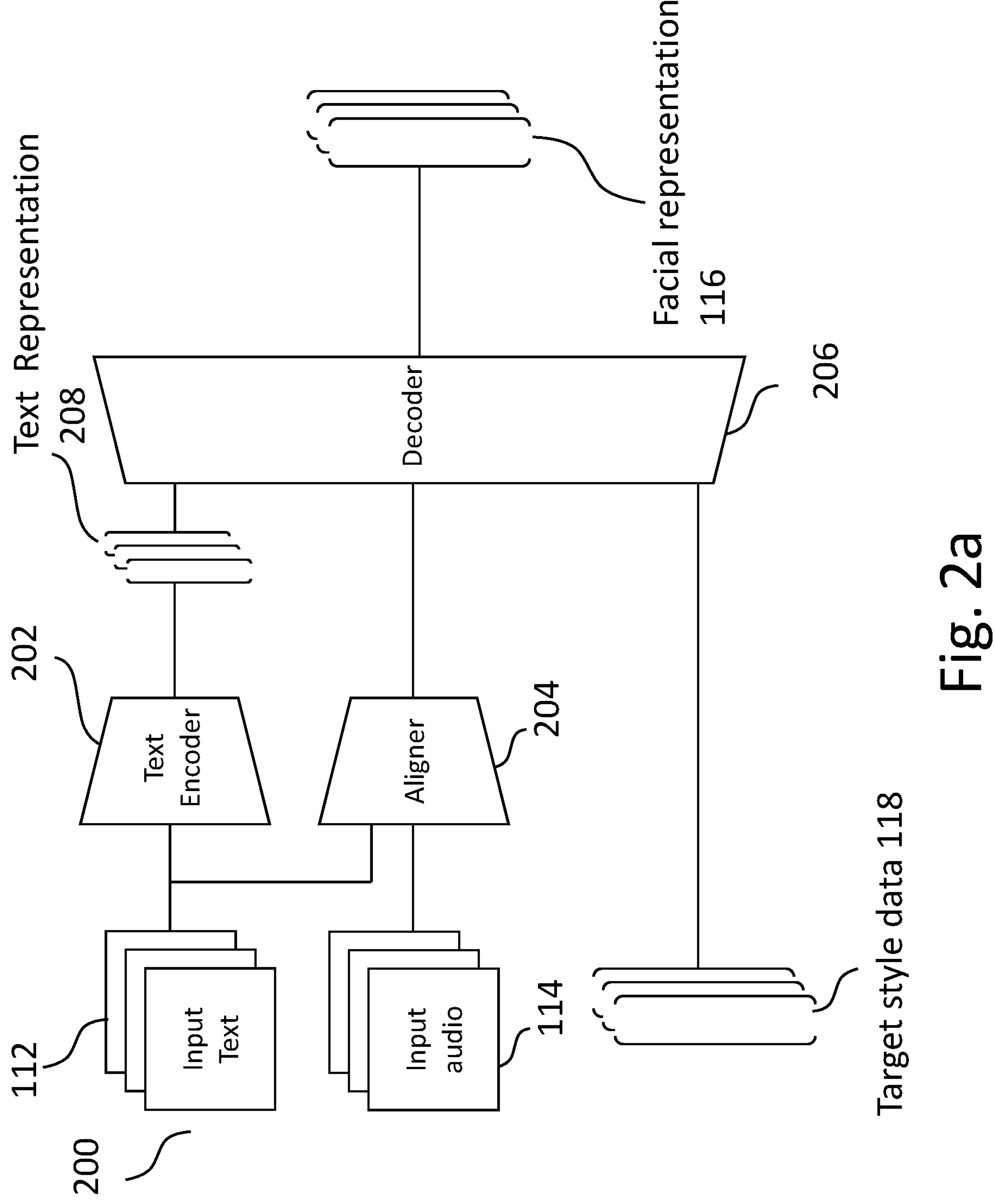
FIG. 2*a* is a block diagram that shows schematically an example of a machine learned model for generating a facial representation.

FIG. 2*a* illustrates an example machine learned model 200 for generating a facial representation 116 (e.g. a 'talking head'). The model 200 is particularly arranged for generating a facial representation 116 demonstrating a particular articulation style or emotion. For example, the facial representation 116 may animate (or define coordinates/other parameters for use in facial animation) expressing spoken words with a style appearing angry, or with a style appearing happy. The model 200 may provide a style-aware audio-driven facial animation method, in which speaking style is disentangled from spoken content.

Due to the complex relationship between the speaking style and the content, and limited audio-visual data (e.g. audio/3D mesh pairs) potentially lacking explicit and accurate style labels, it may be challenging to meaningfully extract styles. In the text-to-speech research domain, style embeddings have been demonstrated that have been learned from speech datasets, and which can effectively control synthesized speech. The present inventors have realized that if the learned styles can control high-fidelity speech generation, then, they can also be used to control realistic facial representation generation. To this end, a model 200 is provided which leverages style information learned for high-resource speech data in order to generate facial representations.

The model 200 may share some components with the Fastspeech2 architecture (see [6], which is incorporated herein by reference in its entirety for all purposes) used for text-to-speech, but adapted for generating a facial representation 116 rather than audio. In particular, the text encoder 202, decoder 206 (apart from final layer), and variance adaptor 220 (apart from phoneme duration and style modifications) described below may have substantially the same architecture as those components described in [6].

The model 200 comprises a text encoder 202, which may be a phoneme encoder. Text encoder 202 is arranged to receive an input text segment (or segments) 112. The input text segment 112 represents the desired content for the output facial representation 116 to appear to speak. The input text segment 112 may specify a series of words. The input text segment 112 may be a script, or part of a script, associated with a film. Having received an input text segment 112, the text encoder 202 is configured to generate a representation 208 of the input text segment. The input text segment 112 may be associated with a transcription of a sentence. The input text segment 112 may have any length.

The text encoder 202 may comprise one or more Transformer blocks, for example Feed-Forward Transformer blocks (FFT). An FFT may comprise a self-attention network, and a 1D convolutional network with ReLu activation. A plurality of such blocks may be stacked into a Transformer to be used as the text encoder 202. The text encoder 202 may have the same form, or substantially the same form, as the phoneme encoder used in Fastspeech2, as described in reference [6].

The model 200 further comprises an aligner 204. The aligner 204 is arranged to receive the same input text segment (or segments) 112 as the text encoder 202. The aligner 204 may further be arranged to receive input audio signals 114. The (or each) input audio signal 114 may correspond to the (or a respective) input text segment 112. For example, input audio 114 may be or represent a recording of a speaker speaking the words of the input text segment 112, or at least a portion of the words of the input text segment. The aligner 204 is configured to determine a time alignment between the input text segment 112 and its corresponding input audio signal 114. For example, the aligner 204 may determine a mapping between locations in the input text segment 112 and corresponding locations in the input audio signal 114.

In some examples, the time alignment generated by aligner 204 may be or may comprise one or more phoneme durations (or durations of any other linguistic division). A phoneme duration is a spoken duration, in the input audio signal 114, of one or more phonemes (or any other linguistic division) of the input text segment 112. The determined duration may then be considered a ground truth duration for those one or more phonemes. As discussed further below, the output facial representation 116 may be generated based at least in part on the ground truth duration of the phonemes. In other words, phoneme duration may be treated in the model 200 as a fixed value, rather than a variable to be predicted. This is contrary to the approach taken in text-to-speech applications, where phoneme duration is typically used as a variable to be predicted. However, the present inventors have realized that for facial animation, variable control should not be extended to phoneme duration since that would result in out-of-sync problems (mouth movements defined by the output facial representation 116 not in sync with the audio to be played with said facial representation 116, for example the input audio 114). Out-of-sync problems can be the most noticeable type of error to a facial animation viewer. Thus, maintaining the ground truth phoneme duration may yield visually improved facial representations 116.

In particular examples, the aligner 204 may be a forced aligner, such as the Montreal forced aligner (MFA) described in Mcauliffe et al., reference [7], which is incorporated herein by reference in its entirety for all purposes. The aligner 204 may be or comprise any other aligner, such as a Kaldi or Julius aligner.

As illustrated in FIG. 2*a*, the model 200 is also arranged to receive target style data 118. Target style data 118 represents a target audio style. For example, target style data 118 may represent an angry style, or a happy style. Target style data 118 may be or comprise one or more vectors defining a target audio style. The target style data 118 may be or comprise a hidden representation. The target style data 118 may be user-defined. For example, a user may input one or more parameters associated with a target audio style into a user interface. The one or more parameters may be used as, or used to generate, the target style data. Such examples may allow a user to manually adjust the style represented by an output facial representation 116, so that a user may tune the apparent emotion expressed by the facial representation for a desired use.

Figure 2B:
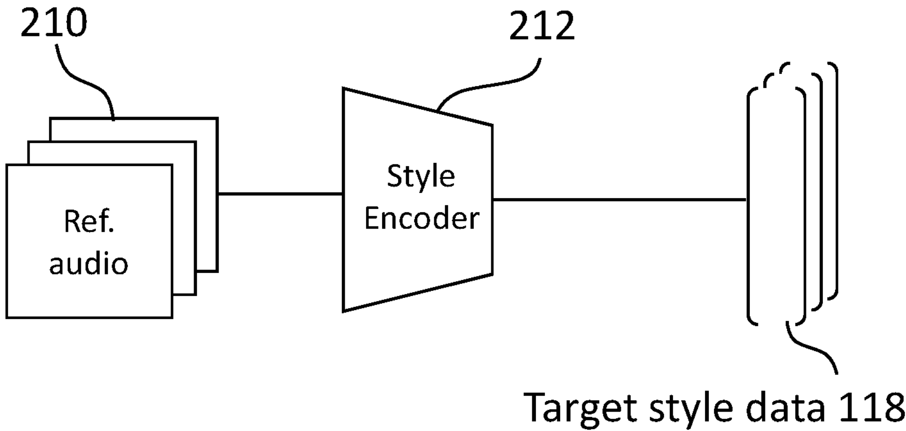
FIG. 2*b* is a block diagram that shows schematically a style encoder for generating target style data.

Alternatively, or additionally, target style data 118 may be generated based on a reference audio signal 210. Such an example is illustrated in FIG. 2*b*. FIG. 2*b* shows a style encoder 212 arranged to receive a reference audio signal 210 exhibiting the target audio style. The style encoder 212 is configured to generate the target style data 118 based at least in part on the reference audio signal 210. This target style data 118 may then be input into the components of model 200 shown in FIG. 2*a*. The style encoder 212 may itself be part of the model 200, or may be operated separately to the model 200. In some examples, the style encoder 212 may have the same, or substantially the same structure as that used in Meta-StyleSpeech, described in reference [8], which is hereby incorporated by reference in its entirety for all purposes. In particular, the style encoder 212 may comprise stacked spectral and temporal processing, multi-head attention and average pooling to obtain the target style data 118. As another example, the style encoder 212 may be or comprise a global style token (GST) structure, as described in reference [19], which is hereby incorporated by reference in its entirety for all purposes.

The reference audio signal 210 may be or represent a recording a speaker speaking with the target audio style. The reference audio signal 210 may be or represent a recording of a speaker who is different to the speaker represented in the input audio 114. The reference audio signal 210 may be unassociated with the input text segment 122. That is, the reference audio signal 210 may be or represent a recording comprising different words to the input text segment 210.

Such examples may be particularly useful for video dubbing of films. In the original language film, an actor may speak with a particular style, which may be represented in their facial movements. To dub the film into a foreign language, it may be desired to replace the apparent mouth movements of the actor with those corresponding to words of a dubbing recording in a target language. A facial representation 116 can be used to automatically modify images of the original language actor to replace their apparent mouth movements. However, it may be desired that replacement mouth movements retain the speaking style or emotion of the original actor. Examples of the present disclosure may allow a facial representation to be generated based on a dubbing actor's input audio 114 and input text segment 112, but using a recording of the original language actor as the reference audio signal 210, so that the output facial representation 116 expresses the words spoken by the dubbing actor, but with the style of the original language actor. Thus, the original language audio may be used as a simple and automated way of tuning a style of a facial representation 116. Such a merging of dubbing audio and original language reference audio may generate facial representations 116, and ultimately modified film, in which the original language actor appears to be speaking the dubbed language with a style that is consistent with the overall original performance of the actor. Thus, the methods disclosed herein may yield facial representations that are more faithful to the context of the original film and appear more realistic than conventionally generated facial representations. Although described in terms of film dubbing, it will be appreciated that there are many different situations where easily tuning a style of facial representation 116 or facial animation by supplying a reference audio signal 210 may be useful. For example, the techniques described herein may be used for avatar generation in augmented reality (AR) and/or virtual reality (VR) applications, video games, teleconferences, and/or e-websites.

In alternative examples, target style data 118 may be generated based on the input audio signal 114. For example, the input audio signal 114 may be used as the reference audio signal 210, being input into the style encoder 212 to generate target style data 118. Such examples may be used where the speaker in the input audio signal 114 expresses the target audio style for the output facial representation 116.

Conventionally, an audio style of an audio signal may be expressed solely by its energy and pitch, which are essentially physical characteristics. However, the present inventors have realized that such a limited representation of style disregards additional style information. This additional information is useful for fully disentangling style from spoken content. Capturing this additional information may allow more accurate facial representations to be generated. Accordingly, in some examples, style may be considered to be defined by pitch, energy, and a style residual. One or more of an energy parameter, a pitch parameter, and a residual parameter (or corresponding vectors comprising a time series of such parameters) may be predicted from the target style data 118, as discussed below, as part of generating the facial representation 116. It has been found that the residual parameter in particular contains information that is useful for optimizing facial representations, as opposed to simply generating a text-to-speech style audio signal, and so is useful for training the model 200, as described in relation to FIGS. 6*a* and 6*b* below.

Returning to FIG. 2*a*, the model 200 further comprises a decoder 206. The decoder 206 is arranged to receive: the representation 208 of the input text segment from the text encoder 202; the time alignment (e.g. comprising phoneme duration) from the aligner 204; and the target style data 118 (or a combined representation thereof, as discussed in relation to FIG. 3). The decoder 206 is configured to generate an output facial representation 116 based at least in part on the representation 208 of the input text segment, the time alignment, and the target style data. The output facial representation 116 comprises a sequence (e.g. a time series) of facial expressions corresponding to the input text segment. In other words, the output facial representation 116 defines a sequence of expressions that appear to read the words of the input text segment. The expressions show the target style represented in the target style data 118.

The decoder 206 may comprise one or more Transformer blocks (e.g feed-forward Transformer blocks) and a top/final layer configured to map the preceding layer outputs to the form of a multi-dimensional facial representation 116. In some examples, the decoder 206 may comprise a similar architecture to the Mel-spectrogram decoder used in Fastspeech2 (see [6]), but with its final layer adapted to generate a facial representation rather than a Mel-spectrogram. Other examples of decoder 206 may be or comprise a recurrent neural network (RNN), or an auto-regressive transformer decoder.

In some examples, the output facial representation 116 may comprise one or more deformation parameters. Deformation parameters may for example encode adjustments applied to a base geometry of a model, thereby causing the model to exhibit different facial expressions, mouth movements, and so on. In some examples, the output facial representation 116 may comprise a blendshape. For example, the decoder 206 may generate a plurality of blendshape weights. For example, the top layer of the decoder 206 may linearly map to a multi-dimensional blendshape vector, such as a 53-dimensional blendshape vector (or, more generally, an n-dimensional blendshape vector, where n is 10 or more; 20 or more; 30 or more; 40 or more; or 50 or more). Blendshape weights can be projected onto 3D meshes to obtain predicted vertices for a facial animation. In some examples, the predicted vertices may be used to determine a plurality of key mouth landmarks from the 68 Multi-PIE landmarks scheme [9].

Figure 3:
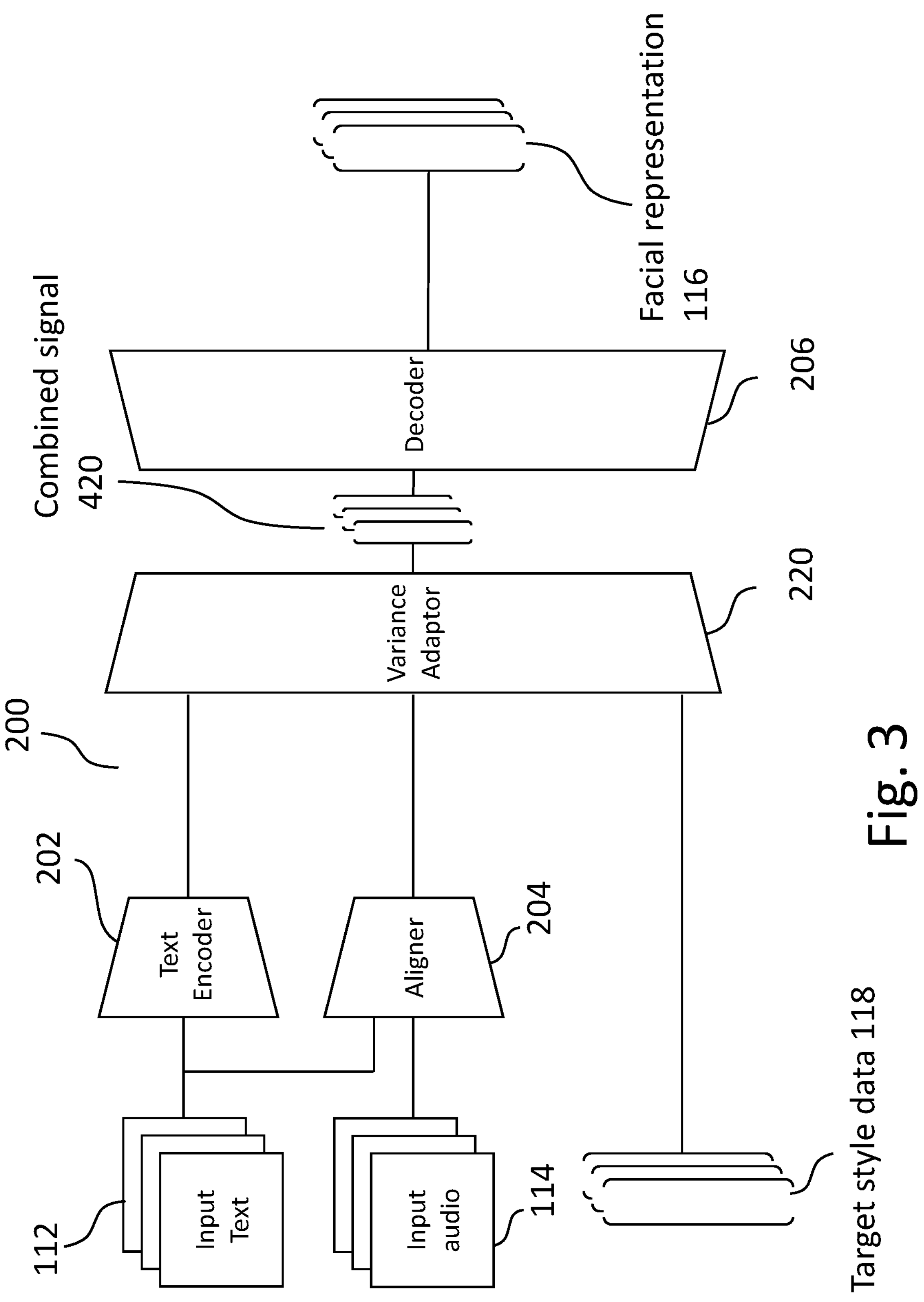
FIG. 3 is a block diagram that shows schematically an alternative example of the model of FIG. 2*a*.

In some examples, for example as illustrated in FIG. 3, the representation 208 of the input text segment 112, the time alignment, and the target style data 118 are combined into a combined signal 420, which is then provided to the decoder 206. In this example, the model 200 further comprises a variance adaptor 220. The variance adaptor 220 is arranged to receive the representation 208 of the input text segment 112 from the text encoder 202; the time alignment (e.g. comprising phoneme duration) from the aligner 204, and the target style data 118. The variance adaptor 220 is configured to generate a combined signal 420 representing a combination of these inputs, and to provide said combined signal to the decoder 206. The decoder 206 then generates the output facial representation 116 based at least in part on the combined signal 420.

Figure 4:
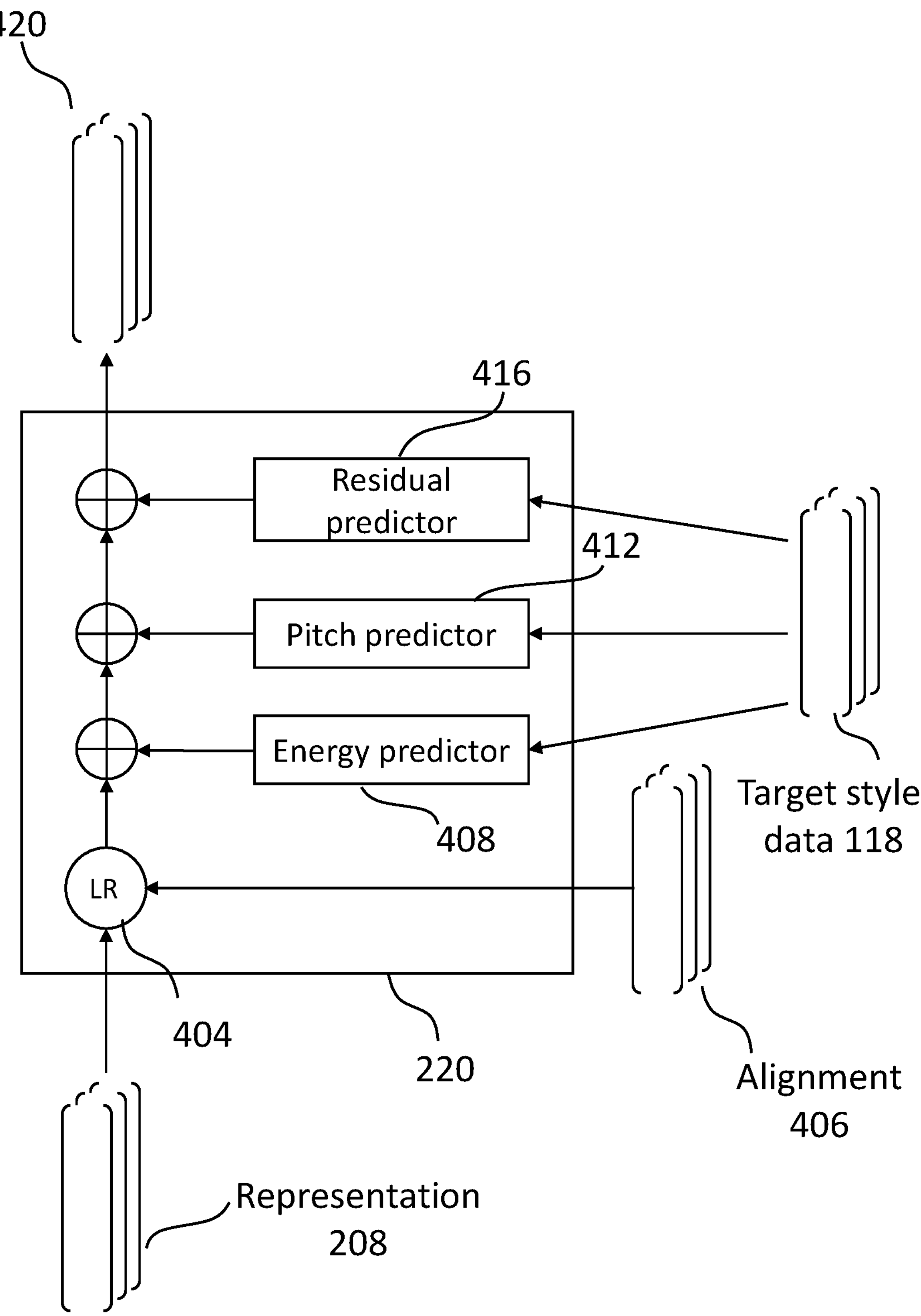
FIG. 4 is a block diagram that shows schematically an example variance adaptor for use in the model of FIG. 3.

In some examples, the variance adaptor 220 may comprise predictor blocks for predicting one or more parameters associated with a style of the target style data 118. In particular, the predictor blocks may predict one or more of an energy parameter, a pitch parameter, and a residual parameter. FIG. 4 illustrates an example of such a variance adaptor 220. In this example, the variance adaptor comprises an energy predictor 408, a pitch predictor 412, and a residual predictor 416 arranged to generate a combined signal 420.

As shown in FIG. 4, the variance adaptor 220 receives the representation 208 of the input text segment 112. The representation 208 may be a text or phoneme embedding. The representation 208 is then modified by a length regulator 404. The length regulator 404 receives the time alignment 406 from the aligner 204, and applies it to the input text segment 112. The length regulator 404 may apply the time alignment 406 to the representation 208 such that the length-regulated representation 208 spans the same time (e.g. frame length) as the input audio 114 (ore representation thereof, e.g. Mel-spectrum). In particular, the length regulator 404 may repeat each phoneme codec of the representation 208 using the phoneme frame length calculated by the aligner 204, such that the length-regulated phoneme sequence of the representation 208 spans the same frame length as the input audio 114. The length regulator 404 may be substantially the same as that used in the variance adaptor of Fastspeech2 [6]. However, instead of predicting a duration as in Fastspeech2, the variance adaptor 220 may receive the ground truth phoneme duration (i.e. the duration of phonemes of the input text segment 112 as spoken in the input audio 114) as determined by aligner 204. As discussed above, using ground truth phoneme duration avoids out-of-sync issues between the output facial representation 116 and the input audio 114 that could occur if following Fastspeech2's duration prediction approach. It is emphasized that as Fastspeech2 is for text-to-speech generation, it does not consider facial representation concerns such as out-of-sync issues.

As further shown in FIG. 4, the representation 208 is further modified to incorporate a predicted energy from the energy predictor 408, and a predicted pitch from the pitch predictor 412. The energy predictor 408 may predict one or more energy values, such as a time series of energy values, based at least in part on the target style data 112. The pitch predictor 412 may predict one or more pitch parameters, such as a time series of pitch values, based at least in part on the target style data 112. The energy predictor 408 and the pitch predictor 412 may share the same structure. In particular, the energy predictor 408 and/or the pitch predictor 412 may comprise one or more stacked self-attention layers. In particular, the energy predictor 408 and/or the pitch predictor 412 may comprise a n-layer 1D-convolutional network with ReLU activation. In some examples, n is 2, but other examples may use any number of such layers. Each such layer may be followed by a layer normalization and dropout layer. The energy predictor 408 and/or pitch predictor 412 may further comprise a linear layer to project the hidden states into the output sequence. The structure of the energy predictor 408 and/or pitch predictor 412 may be substantially the same as the corresponding components in the variance adaptor of Fastspeech2 [6]. In contrast to Fastspeech2, however, the predicted pitch and energy may be conditioned on style information, rather than only relying on the aligned text. In particular, the energy predictor 408 and pitch predictor 412 may receive the target style data 118 as an input. The energy predictor 408 and/or pitch predictor 412 may further receive the time alignment from the aligner 204 as an input. In particular, the energy predictor 408 and/or the pitch predictor 412 may receive a phoneme duration, or sequence of phoneme durations for the input text segment 112, as an input. The structure of and inputs to the energy predictor 408 and/or pitch predictor 412 may be the same, or similar to, the corresponding components described in Li et al. (ref. [10]), which is incorporated herein by reference in its entirety for all purposes. The energy predictor 408 and/or pitch predictor 412 may output their respective parameters as respective pitch/energy embeddings, which may be added to the length-regulated representation 208. As discussed further below, in some examples the energy predictor 408 and/or pitch predictor 412 may additionally receive 'fake' pitch/energy inputs to augment the information provided to the predictors 408, 412.

As illustrated in FIG. 4, the variance adaptor 220 is further modified to incorporate a predicted residual parameter from a residual predictor 416. The residual predictor 418 may receive the target style data 118, and may generate a representation of the style residual which is combined into the representation 208. As discussed above, the style residual may capture additional information beyond pitch, and energy which would not otherwise be captured, and promotes generation of accurate facial representations 116 (and, in training, promotes Mel-spectrum reconstruction as described below). In essence, the style residual may be considered to provide additional parameter space to capture remaining style information contained within the target style data 118, after energy and pitch have been considered.

The residual predictor 416 may have a structure comprising n stacked linear layers, each followed by a ReLU or Tanh activation layer. For example, the residual predictor 416 may comprise a first linear layer followed by a ReLU activation layer; and a second linear layer followed by a Tanh activation layer.

Although the example shown in FIG. 4 comprises an energy predictor 408, pitch predictor 412, and residual predictor 416, other examples may omit one or more of these predictors. Such examples may use a ground truth value of energy, pitch, and/or style residual instead of generating predictions. Such ground truth values may be extracted from the reference audio signal 210, or may otherwise be specified in the target style data 118, for example based on user input.

The combined signal 420 generated by the combination of components discussed above is output from the variance adaptor 220, and is input into the decoder 206 to generate the output facial representation 116 as discussed above.

Figure 8A:
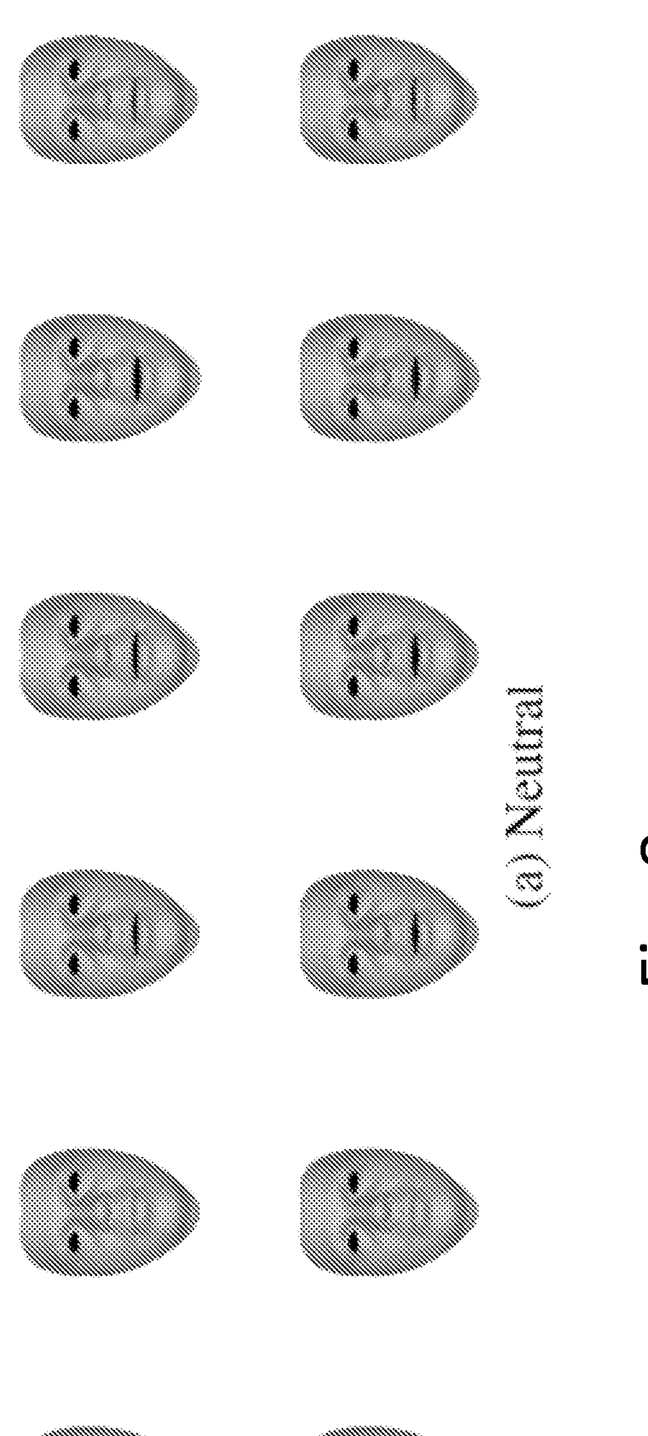
FIGS. 8*a*, 8*b*, and 9 show images of example sequences of expressions of facial representations generated by the model.
Figure 8B:
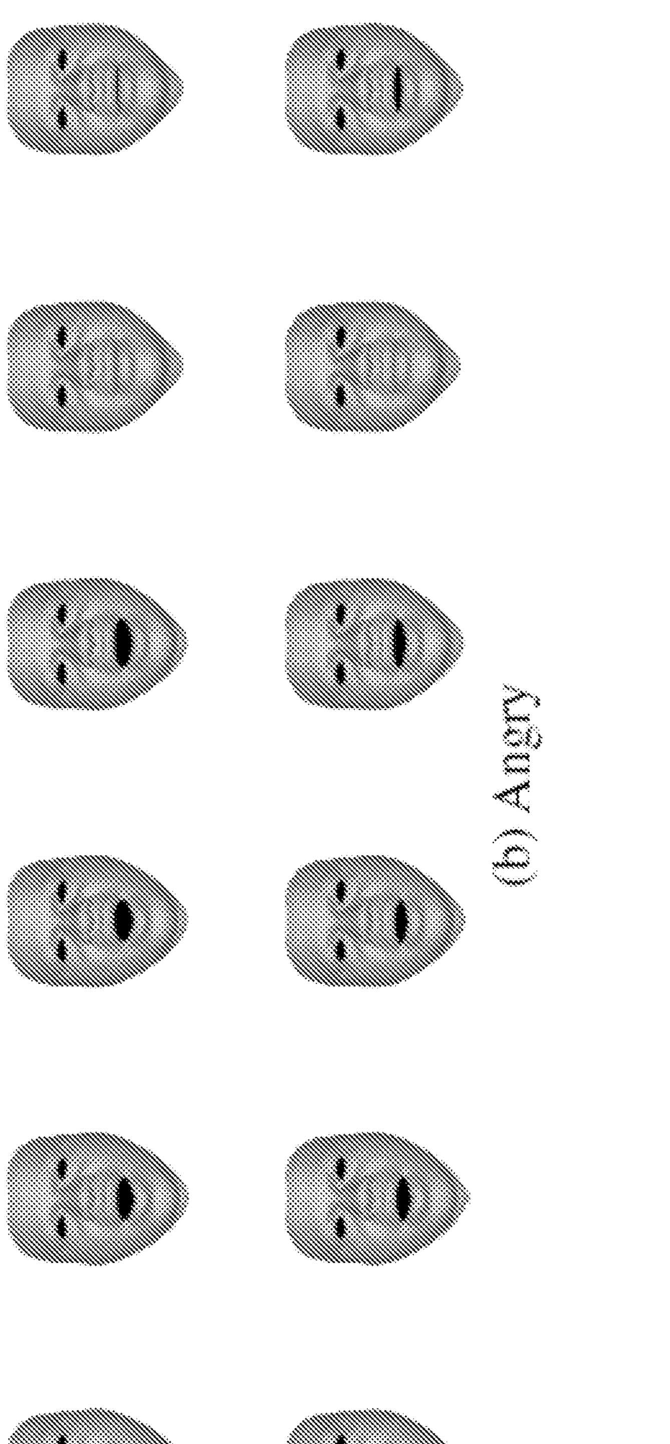

The model 200 thus provides an automated means for generating facial representations 116, such as blendshapes, which appear to speak words of an input text segment 112 with a desired style. The model 200 may infer the implicit speaking style from a reference audio signal 210, to control realistic facial representations. FIGS. 8*a* and 8*b* show examples of two speech driven facial representations generated by such a model 200 (trained as discussed in the 'Results' section below). FIG. 8*a* shows a time series of expressions of a facial representation expressing a neutral style. FIG. 8*b* shows a time series of expressions of a facial representation expressing an angry style. In each case the top row is the ground truth, and the bottom row is generated by a model 200. As can be seen, the overall movements of the predicted and ground truth blendshapes are similar. Thus, the model 200 is capable of generating practical and accurate articulations.

Figure 9:
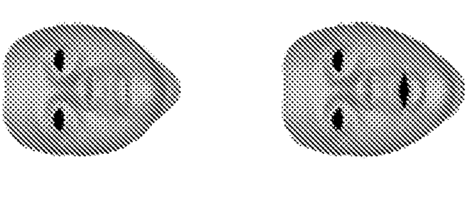
Figure 9:
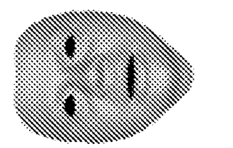
Figure 9:
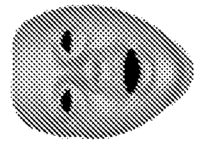
Figure 9:
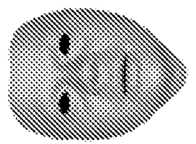
Figure 9:
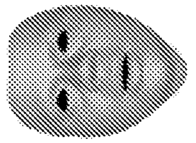
Figure 9:
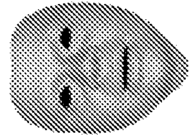
Figure 9:
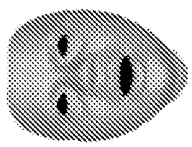
Figure 9:
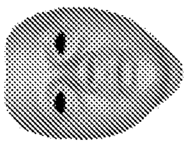
Figure 9:
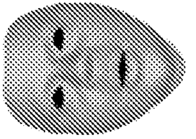
Figure 9:
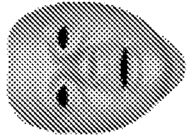
Figure 9:
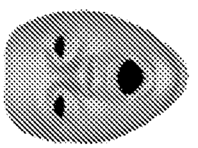

In addition, when the style embedding (i.e. target style data 118) is extracted from a reference audio signal 210 of different speaking style to the input audio signal 114, the reference audio signal 210 implicitly controls the speaking style of the generated animation. For instance, FIG. 9 shows an example of selecting a different style reference audio to control blendshape generation. The original driving audio (the input audio signal 114) is neutral, and the top row of FIG. 9 shows the generated facial representation when using style information extracted from the driving audio. The bottom row of FIG. 9 illustrates the situation when the style embedding is instead extracted from an angry-toned reference audio signal 210. As can be seen, the emotion-transferred video has more drastic mouth movements. For instance, wider mouth openings and highlighted Mouth-Pucker blendshape can be observed in the bottom row in FIG. 9.

In addition to style manipulation, for example via a reference audio signal 210, the model 200 may also be used to manipulate expressed content. This may be achieved by modifying the input text segment 112 compared to the input audio signal 114. For example, one or more words of the input text segment 112 may differ from those represented in the input audio signal 114. Thus, in some examples, the model 200 may receive a modified input text segment 112. The input text segment 112 may be modified by software associated with the model 200, for example software implementing the model 200. There is no need to modify the input audio signal 114 itself, as the output facial representation 116 is primarily controlled in the model 200 by the input text segment 112 and the target style data 118.

Although the various components of the model 200 have been discussed above as comprising particular structures, it is to be appreciated that any suitable structure may be used for any of the components of the model 200. In particular, the components may each comprise any suitable neural network model or arrangement capable of generating the respective output of that component from the respective input(s) described above.

Figure 5:
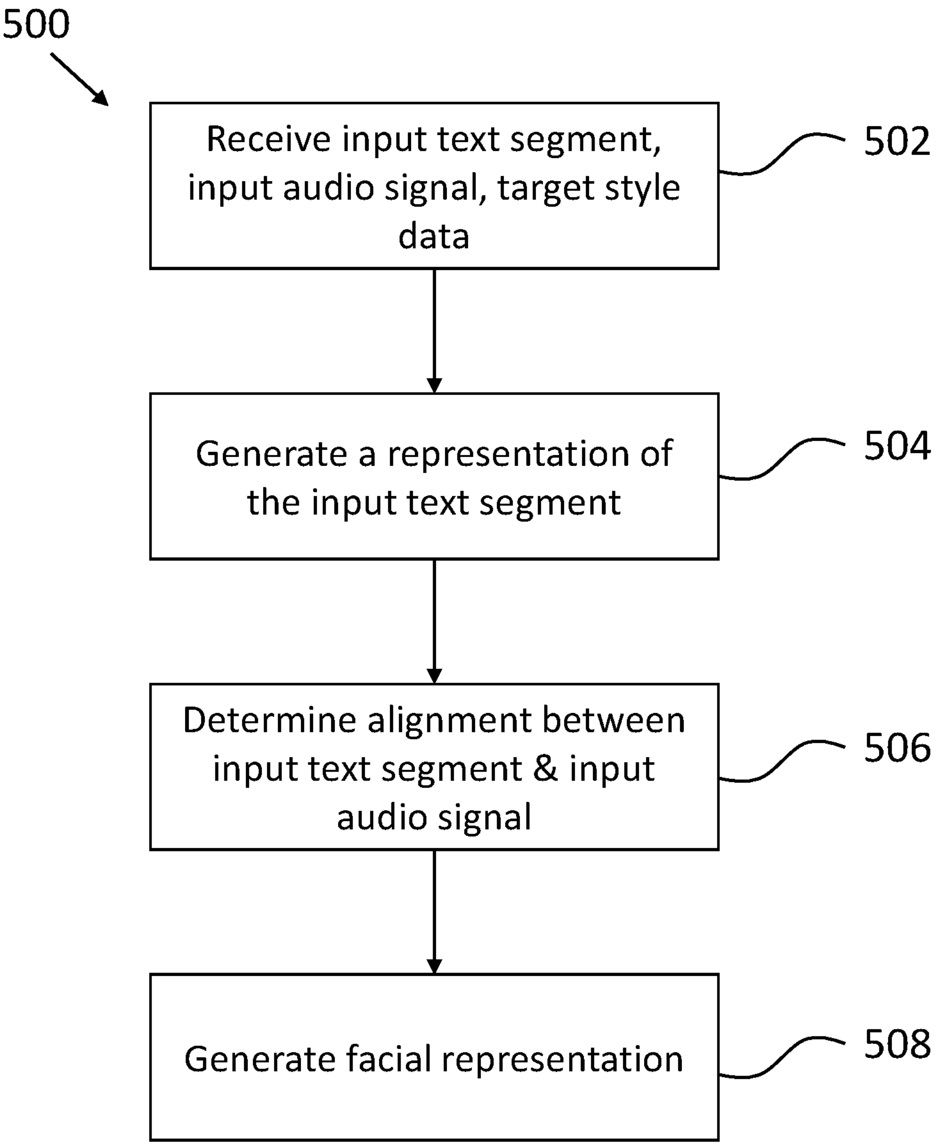
FIG. 5 is a flow diagram that illustrates a method of generating a facial representation.

FIG. 5 illustrates a method 500 of generating a facial representation 116. The method 500 may be implemented by a computing system, such as the system 100 shown in FIG. 1. The method 500 may be implemented by a computing system comprising one or more processors and one or more storage media (e.g. non-transitory storage media) storing instructions which, when executed by the one or more processors, cause the computing system to perform the method 500. The method 500 may be implemented by one or more storage media (e.g. non-transitory storage media) storing machine readable instructions which, when executed by one or more processors, cause the one or more processors to carry out the method 500. The method 500 may be implemented as a computer program comprising instructions which, when executed by a computer, cause the computer to perform the method 500.

The method 500 comprises an operation 502. The operation 502 comprises receiving, at a machine learned model 200, an input text segment 112, an input audio signal 114 corresponding to the input text segment 112, and target style data 118, wherein the target style data represents a target audio style.

The method 500 further comprises an operation 504. The operation 504 comprises generating, by a text encoder 202 of the machine learned model 200, a representation 208 of the input text segment 112.

The method 500 further comprises an operation 506. The operation 506 comprises determining, by an aligner 204 of the machine learned model 200, a time alignment between the input text segment 112 and the input audio signal 114.

The method 500 further comprises an operation 508. The operation 508 comprises generating, by a decoder 206 of the machine learned model 200, the facial representation 116 based at least in part on the representation 208 of the input text segment, the time alignment, and the target style data 118, wherein the facial representation 116 comprises a sequence of facial expressions corresponding to the input text segment 112.

In some examples, the method 500 may further comprise generating video data based on the output facial representation 116 (or output facial representations 116). In particular, some examples may comprise receiving input video data comprising target footage of a target human face; and generating output video data based at least in part on the input video data and on the facial representation, wherein, in the output video data, the target human face exhibits the sequence of facial expressions corresponding to the input text segment. For example, the method 500 may comprise modifying the target human face of the input video data using the facial representation 116. Such approaches may modify the apparent facial or mouth movements of the target human face, but otherwise retain the original appearance of the target human face. When used for visual dubbing of films, the target human face may be that of the original language actor. Methods of modifying videos based on a given facial representation, such as a blendshape, are discussed for example in U.S. Pat. No. 11,562,597 B1, which is incorporated herein by reference in its entirety for all purposes.

In some examples the method 500 may comprise training the model 200. Training the model 200 may comprise performing method 700 described below.

Training

Figure 6A:
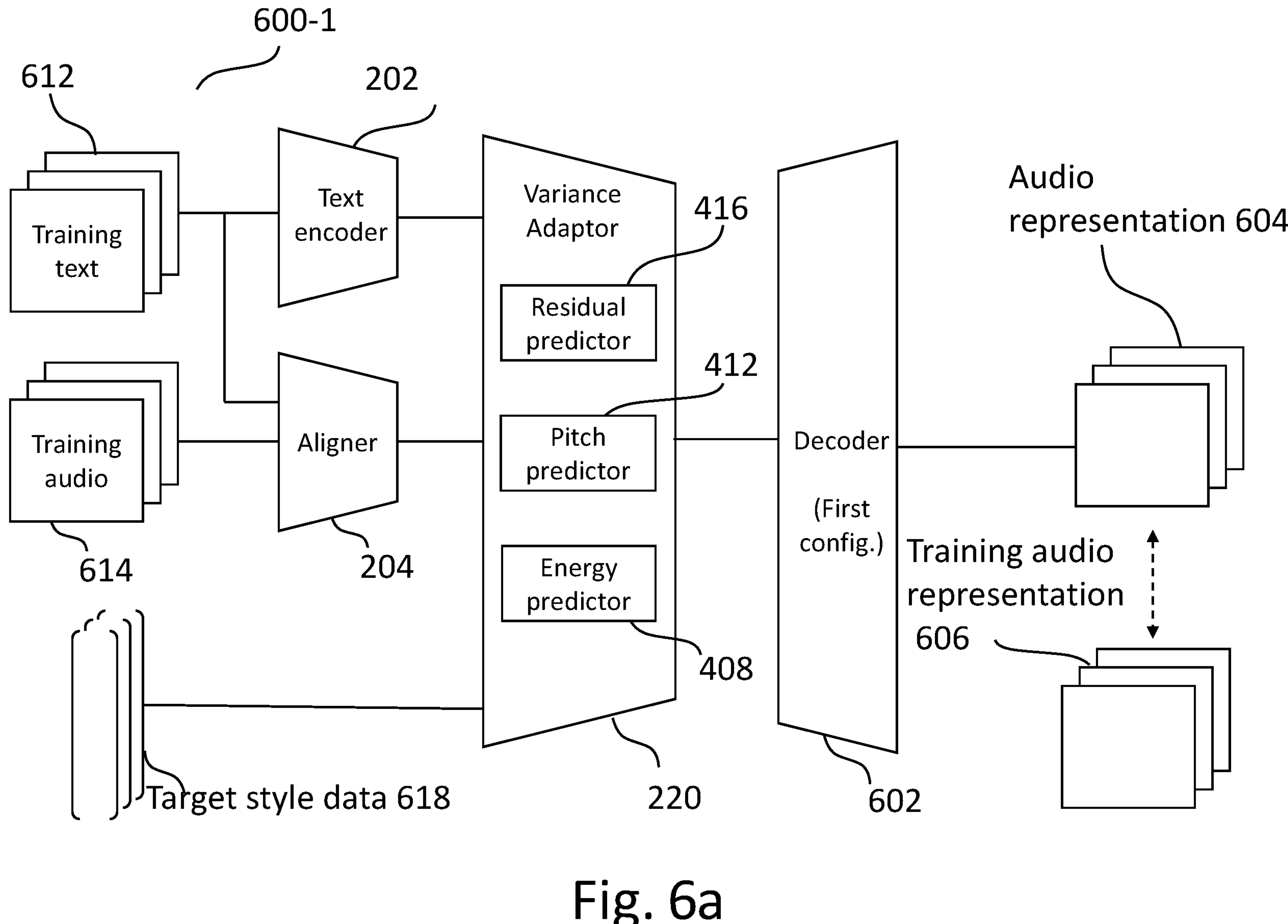
FIG. 6*a* is a block diagram that shows schematically an example of a machine learning model in a first training configuration.
Figure 6B:
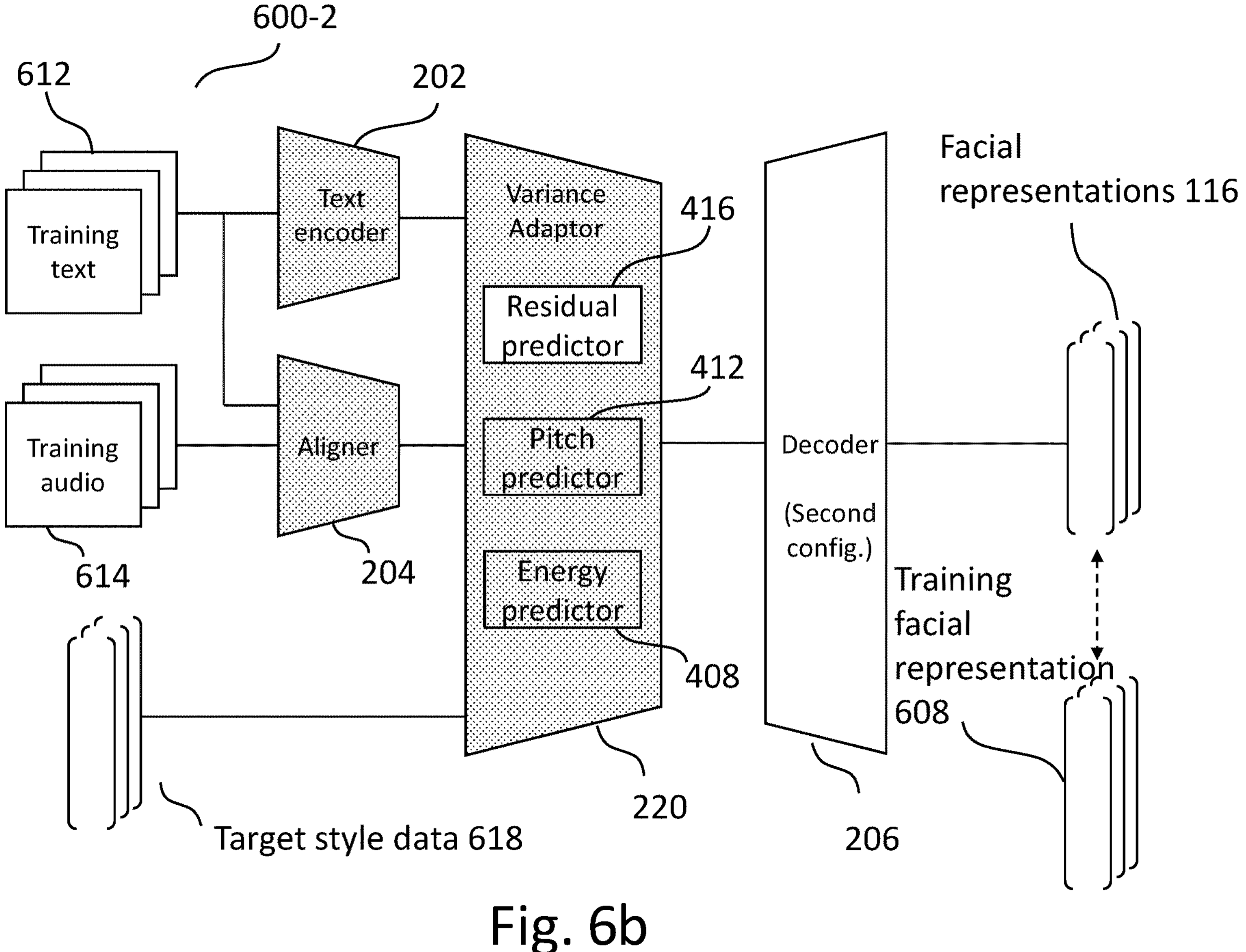
FIG. 6*b* is a block diagram that shows schematically an example of a machine learning model in a second training configuration.
Figure 7:
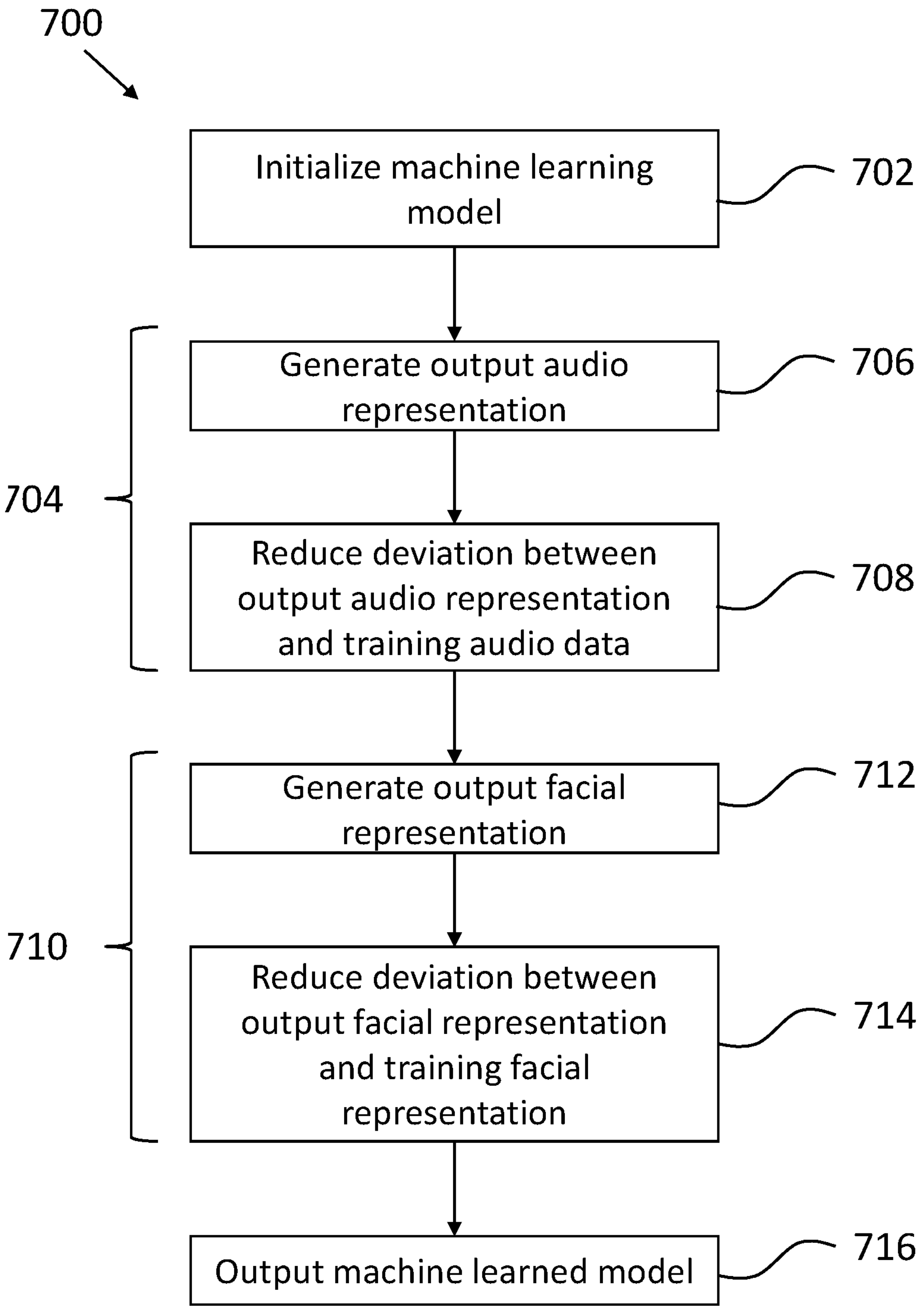
FIG. 7 is a flow diagram that illustrates a method of training a machine learning model for generating a facial representation.

FIGS. 6*a*, 6*b*, and 7 illustrate training a machine learning model, to generate a machine learned model such as model 200. FIG. 7 illustrates a method 700 of training a machine learning model. FIGS. 6*a* and 6*b* illustrate the architecture of an example machine learning model 600 being trained in accordance with the method 700.

It may be expected that a model for generating facial representations 116, such as model 200, would be trained purely using training data comprising training facial representations, for example containing measured facial movements of speakers. However, measuring facial movements requires specialized equipment. As a result, there is only a limited amount of such training data available, especially for training data encompassing a range of speaking styles/emotions. However, the present inventors have realized that the model 200 can be trained primarily using audio alone, and can then be fine-tuned using facial representation-specific training data. Training data comprising spoken audio is widely available, for example for use in text-to-speech applications. The method 700 can use such widely used audio training data in order to generate more accurate facial representations.

The method 700 may be implemented by a computing system, such as system 100 shown in FIG. 1. The method 700 may be implemented by a computing system comprising one or more processors and one or more storage media (e.g. non-transitory storage media) storing instructions which, when executed by the one or more processors, cause the computing system to perform the method 700. The method 700 may be implemented by one or more storage media (e.g. non-transitory storage media) storing machine readable instructions which, when executed by one or more processors, cause the one or more processors to carry out the method 700. The method 700 may be implemented as a computer program comprising instructions which, when executed by a computer, cause the computer to perform the method 700.

The method 700 starts at operation 702, at which a machine learning model 600 is initialized. The machine learning model 600 may have substantially the same structure as any example of the machine learned model 200 discussed above. In particular, the machine learning model 600 may comprise a text encoder 202 configured to generate, from a received text segment 112, a representation of the received text segment; an aligner 204 configured to determine a time alignment between the received text segment 112, 612 and a received audio signal 114, 614 corresponding to the received text segment 112, 612; and a decoder 206 configured to generate an output based at least in part on the representation of the received text segment 112, 612, the time alignment, and a received target style data representing an audio style. Initializing the machine learning model 600 may comprise determining one or more initial (e.g. random) weights associated with the components of the model 600 to be trained in the subsequent steps, and/or setting one or more hyperparameters defining the model 600 or any component thereof.

The method 700 then proceeds to training the machine learning model 600 in two training stages. A first training stage 704 comprises the method operations 706 and 708. A second training stage 710 comprises the method operations 712 and 714.

In the first training stage 706, the machine learning model 600 is provided in a first configuration 600-1. An example of a machine learning model 600 in its first configuration 600-1 is shown in FIG. 6*a*. In the first configuration 600-1, the model 600 is configured to generate an audio representation 604, rather than a facial representation 116. First representation 600-1 may be considered a seq2seq model. In particular, the decoder 602 may be configured to generate an audio representation 604, such as a Mel-spectrogram representing an audio signal. The decoder 602 may comprise the same architecture as the decoder 206 described above in relation to FIG. 2, but with its final layer altered to map to an audio representation rather than a facial representation. For example, the final layer of decoder 602 may linearly map to a multi-dimensional Mel-spectrogram. The Mel-spectrogram may be an n-dimensional Mel-spectrogram, where n is 20 or more, 40 or more, 60 or more, or 80 or more. All other components of the machine learning model 600 may have the same structure as the corresponding component described above for the machine learned model 200, and may be implemented in accordance with any of the examples described in relation to the model 200, for example.

Accordingly, the first training stage 704 of method 700 comprises operation 706, at which an output audio representation 604 is generated based on a first training text segment 612 and a corresponding first training audio signal 614. The training text segment 612 and the training audio signal 614 may have the same form as the input text data 112 and the input audio signal 114 discussed above. The first training style data 618 may be generated from the first training audio signal 614, and may be provided to the decoder 602 (e.g. via variance adaptor 220), in the same manner as discussed in relation to FIG. 2.

The first training stage 704 further comprises the operation 708, comprising updating the machine learning model 600-1 so as to reduce a deviation between the output audio representation 604 and an audio representation 606 of the first training audio signal 614. For example, a Mel-spectrogram may be determined directly from the first training audio signal 614. This directly determined Mel-spectrogram may be compared to the audio representation 604 generated by model 600-1. Updating the machine learning model 600-1 may comprise updating one or more weights of the model 600-1, using standard optimization techniques. For example, an optimizer such as an Adam optimizer may be used to update the one or more weights.

In some examples, reducing a deviation in operation 708 may comprise determining a loss using a loss function, and modifying the one or more weights to reduce the loss. The loss function may represent only the deviation between the output audio signal 604 and the representation of the first training audio signal 614. However, in other examples, additional loss terms relating to style parameters (e.g. pitch, energy, and/or style residual) may be included, which may allow the model to more accurately predict pitch and energy, and so yield more accurate and/or more richly controllable facial animations. For example, the loss function, Lstagel, for the first training stage 706 may be:

$$Lstage1 = Lmel + Lpitch + Lenergy + Lresidual, \quad (1)$$

where Lmel=MAE (•, •) represents the Mel-spectrogram reconstruction error, that is, a measure of the overall difference between the output audio representation 604 and representation of the input audio 614. For example, Lmel maybe the mean absolute error of the Mel-spectrogram reconstruction loss. The predicted Mel-spectrum is the top layer output from the Decoder (Text, $\hat{p}_{:t}$, $\hat{e}_{:t}$, r), where 'Text' represents the duration regulated phoneme encoding, $\hat{p}_{:t}$ is the predicted pitch, $\hat{e}_{:t}$ is the predicted energy, r is the style residual, and t denotes time series (i.e. each vector comprises a time series of corresponding parameters, such as residual parameters, representing the time varying pitch/energy/residual of the input audio 604). Lpitch is loss associated with the pitch prediction. Lpitch may be calculated as Lpitch=MSE ($p_{:t}$, $\hat{p}_{:t}$) (i.e. the mean squared error between the true pitch of the input audio and the predicted pitch), with $$\hat{p}_{:t} = PitchPredictor(\text{Text}, DA(p_{:t}), e_{:t}, s). \quad (2)$$

Similarly, Lenergy is the loss associated with the energy prediction. Lenergy may be calculated as Lenergy=MSE ($e_{:t}$, $\hat{e}_{:t}$), with $$\hat{e}_{:t} = EnergyPredictor(\text{Text}, DA(e_{:t}), \hat{p}_{:t}, s), \quad (3)$$

where DA ($p_{:t}$) and DA ($e_{:t}$) are, respectively, an optional fake pitch and optional fake energy generated by data augmentation (DA) and simulating an unseen speaker. Data augmentation is discussed further below. To balance different loss terms, the ground-truth/predicted pitch, and energy features may be normalized before applying the MSE loss. s is the target style data, for example in the form of a style vector. Thus, in other words, the duration regulated phoneme encoding, the predicted pitch, the style vector, and, optionally, a fake energy may be provided to the energy predictor to predict an energy.

When determining the residual loss, to mitigate the mutual information between style residual, and pitch and energy, an adversarial learning strategy may be employed. On the one hand, the residual vector r contributes to the overall Mel-regression task. On the other hand, errors are maximized when replacing the style vector (or generally target style data) with the residual vector to predict pitch and energy. This error maximization process can be achieved via a gradient reversal layer that outputs residual vector ř with reversed gradient.

Accordingly, the residual loss Lresidual may calculated as the summation of MSE ($p_{:t}$, $\hat{p}_{r,:t}$) and MSE ($e_{:t}$, $\hat{e}_{r,:t}$). $\hat{p}_{r,:t}$ and $\hat{e}_{r,:t}$ are the predicted outputs of the pitch predictor and energy predictor respectively when style vector s input to the pitch/energy predictor is replaced with the residual vector with reversal gradient, ř, so that:

$$\hat{p}_{r,:t} = PitchPredictor(\text{Text}, DA(p_{:t}), \hat{e}_{:t}, \check{r}), \quad (4)$$

$$\hat{e}_{r,:t} = EnergyPredictor(\text{Text}, DA(e_{:t}), \hat{p}_{:t}, \check{r}). \quad (5)$$

It is noted that the gradient reversal layer may be applied only for training the machine learning model 600, it may not be a feature of the trained machine learned model 200.

As noted above, a 'fake energy' and 'fake pitch' may be input into the pitch predictor and energy predictor along with the target style data/style vector. These extra inputs may allow the machine learning model 600 to explore as much available information as possible to boost accuracy. For instance, if another unseen speaker utters the same sentence at the same speed, the trend in this speaker's pitch curve would help the style vector to control the pitch predictor to generate relevant pitch curve. Accordingly, data augmentation may be used to generate fake pitch and fake energy values from unseen speakers.

Fake pitch and energy may be generated from unseen speakers. Given a pitch curve, a simple and yet popular pitch modification is linear pitch shifting. Linear pitch shifting is described in Mousa et al. [11], which is hereby incorporated by reference in its entirety for all purposes. Non-linear statistics-based pitch shifting can also be used, however, this often requires a large amount of person-specific data. Thus, the following pitch data augmentation may be used:

$$\hat{p}_{:t} = ap_{:t} + bSigmoid((p_{:t} - c)/50), \quad (6)$$

where the linear scaling parameter a may be drawn from the uniform distribution [low, high] and depends on input pitch $p_{:t}$ range. With this linear term, the simulated pitch covers most audible human pitch range. The nonlinear scaling term, b and c may be drawn from normal, and uniform distributions, respectively. With this nonlinear term, the simulated pitch covers a wider range of individual differences. Monotonic constrains are enforced on pitch augmentation, in order to preserve local pitch dynamics. In a particular example, the low and high range to draw the linear parameter a in Equation 6 is calculated as: high=−0.005 medium $(p_{:t})$+2.5, and low=−0.0025 medium $(p_{:t})$+1.25. Then high and low are respectively thresholded by [1, 2] and [0.5, 1]. The nonlinear parameter b is drawn from $$b = (33a + 34)\aleph(\cdot)|_{-1}^{1},$$

where $$\aleph(\cdot)|_{-1}^{1}$$

denotes drawing from a unit Gaussian distribution and threshold with [−1, 1]. As thus, when a is scaled at the extreme case of 0.5, the maximum b is ±50.5. And when a is scaled at of 2.0, the maximum b is ±100. For both extreme cases, the pitch augmentation function is guaranteed to be monotonic. The shifting parameter c may be drawn from a uniform distribution, such as the uniform distribution between [100, 200].

For energy data augmentation, a random scaling parameter is drawn every N frames (where a frame represents a time slice of the input audio signal). Spline interpolation is then applied to generate a smooth scaling parameters covering each frame. This scaling parameter is then multiplied with a given energy curve to simulate a new energy curve. In a particular example, For the energy augmentation, we set every N=50 frames to draw a random scaling variable. To balance different loss terms, different features are normalized. All audio signals are normalized with mono-channel, 16 KHz sampling rate and maximum magnitude of 1.0. The pitch is normalized via (pitch−150.0)/50 and energy via energy/50.

As will be appreciated, the operations 706 and 708 may be repeated a number of times to optimize the machine learning model 600-1 based on the deviation (e.g. loss) between the output audio representation 604 and the representation 606 of the training audio signal. For example, the operations 706 and 708 may be repeated until the deviation converges. In particular, the operations 706 and 708 may be performed for a plurality of first training text segments 612 and corresponding first training audio signals 614. Such first training text segments 612 and first training audio signals 614 may be selected from a training data set that does not have associated training facial representations (e.g. measurements of facial movements of a speaker). For example, the training data set may be for training text-to-speech models. Separate examples of first training data may be generated from a single audio file, for example breaking an audio file into separate portions and treating each portion as a first training audio signal 614 (having a corresponding portion of training text as the training text segment 612). During the first training stage 704, weights of all the components of the machine learning model 600-1 may be available to be trained to optimize the machine learning model 600-1.

After completing the first training stage 704, the method 700 proceeds to the second training stage 710. In the second training stage 710, the machine learning model 600 is provided in a second configuration 600-2. An example of the machine learning model 600 of FIG. **6*a* in its second configuration 600-2 is shown in FIG. 6*b*. In the second configuration 600-2, the machine learning model 600 is configured to generate an output facial representation, as in the machine learned model 200, rather than the audio representation 604. In particular, the decoder of the second configuration 600-2 may have the same structure as the decoder 206 discussed above in relation to the machine learned model 200. The final layer of the decoder 206 in the second configuration 600-2 may be altered relative to the first configuration 600-1 to map to a facial representation 116 (e.g. a blendshape). For example, the final layer of decoder 206 may mapped to a multi-dimensional blendshape vector. The blendshape vector be an n-dimensional blendshape vector, where n is 20 or more, 30 or more, 40 or more, or 50 or more. In a particular example, as used to generate the results discussed below in relation to FIGS. 81, 8*b*, and 9, n is 53. All other components of the second configuration 600-2 may be the same as those of the first configuration 600-1, and of machine learned model 200. Any of the example implementations discussed in relation to the components 200 may apply equally to the corresponding components of the second configuration 600-2 of the machine learning model 600**.

Accordingly, the second training stage 710 comprises the operation 712, at which an output facial representation 116 is generated by the decoder 206 (in its second configuration) based at least in part on a second training data segment 612 and a corresponding second training audio signal 614. Unlike the first training data segment 612 and first training audio signal 614 used in the first training stage 704, the second training data segment 612 and second training audio signal 614 have a corresponding training facial representation 608. The training facial representation 608 may represent a sequence of facial expressions corresponding to speech in the second training audio signal 614. In other words, the second training data may from a set of training data comprising facial measurements of a speaker as well as a recording of that speaker, and the text spoken. The availability of such training data may be much more limited than purely text and audio-based training data, as may be used in the first training stage 704. However, because initial training has already been performed using the first training data, the second training stage 710 can effectively act as a fine-tuning process, requiring much less training data. Indeed, the inventors have found that accurate facial representations can be generated when training using the method 700 with only a few hours of facial training data. In some examples, in the first training stage 704 the model 600 may be trained with a first duration of training audio signals, and during the second training stage 710 the machine learning model 600 may be trained with a second duration of training audio signals, wherein the first duration is at least five times the second duration, or at least ten times the second duration. Such ratios of first and second training data have been found to yield accurate facial representations, despite the limited availability of facial (second) training data.

The second training stage 710 further comprises operation 714, comprising updating the machine learning model 600-2 so as to reduce a deviation between the output facial representation 116 and the training facial representation 608 corresponding to the second training text segment 612 and second training audio signal 614. In particular, one or more weights of the model 600-2 may be updated in the operation 714 based on the deviation. However, because the weights have already been trained, at least partially, based on the audio (first) training data, it has been found that many of the weights can be held fixed in the second training operation 710. It has been realized that these features relate primarily to physical characteristics of the text and audio, and so may be sufficiently trained on the audio-based first training data alone. Instead, the style residual may be used to capture information within the training audio signal 614 that remains after predicting pitch and energy. The style residual may thus be used to capture the differences when training is switched to the second training stage 710, and training facial representations 608 are used. Therefore, one or more weights of the residual predictor 416 may be adjusted in the operation 714. One or more weights of the decoder 206 may also be adjusted, at least in the changed final layer of the decoder 206 compared to the first configuration 600-1.

Therefore, in some examples, (at least some of the) weights associated with the text encoder, energy, and/or pitch may be held fixed during the second training stage 710. Thus, weights of the text encoder 202, pitch predictor 412 and energy predictor 408 may be held fixed in the second training stage 710. Operation 714 may comprise updating one or more weights only of the residual predictor 416 and/or decoder 206. In the example of FIG. 6*b*, components whose weights are held fixed are shown as shaded.

In some examples, reducing a deviation may comprise determining a loss using a loss function, and modifying the one or more weights to reduce the loss. The loss function may represent the deviation between the output facial representation 116 and the training facial representation 608. In examples where the facial representation 116 comprises a blendshape vector, blendshape weights may be projected onto 3D meshes via 3DMM, to obtain predicted vertices of a facial animation, from which a plurality of facial landmarks (e.g. landmarks associated with the mouth) can be generated. In such examples, the loss function for the second training stage 710, LstageII, may be $$LstageII = Lgeometry + Ltemporal + Lclosure, \quad (7)$$

where Lgeometry is the summation losses (e.g. mean absolute error, MAE, losses) over vertices, landmarks, and blendshape weights. To prioritize mouth movements that are more correlated with the audio, higher weights may be given to lower-face vertices when calculating the vertex loss. For example, the lower x % of vertices on the face may be assigned a higher weight, where x % is 30% or more, or 40% or more, or 50% or more; and/or is 50% or less, or 40% or less, or 30% or less, or any combination thereof. Such lower vertices may be weighted y times higher than other vertices, where y is two or more, or three or more, or is approximately three. Ltemporal is the loss (e.g. MAE loss) over the first-order difference (i.e. dynamics) of landmarks and blendshape weights. This term may promote temporal smoothness. Further, since, mouth closures are very important for human perception of overall audio-visual sync, mouth closure loss may be included. Ground truth mouth closures may be detected from a ground truth 3D mesh of the training facial representation 608. For example, a time series of inner lip distances may be determined. Valleys in this inner lip distance time series may be deemed to be mouth closures. A ReLU function may then be applied over the predicted inner lip distance over these frames. In other examples, one or more of the terms Lgeometry, Ltemporal, Lclosure may be omitted when calculating second training stage 710 loss. In examples using 3DMM, any 3DMM model may be used. For example an additive 3DMM head model may be used, in which case the 3D meshes may be mapped from the blendshape weights, via linear weighted summation of the blendshape basis on top of a neutral face mesh. The key facial landmarks' indices over a 3DMM are fixed, and thus the key landmarks can be directly extracted from the 3D meshes.

As will be appreciated, the operations 712 and 714 may be repeated a number of times to optimize the model 600-2 based on the deviation (e.g. loss) between the output facial representation 116 and the training facial representation 608. For example, the operations 712 and 714 may be repeated until the deviation converges. In particular, the operations 712 and 714 may be performed for a plurality of second training text segments 612 and corresponding second training audio signals 614 and training facial representations 608.

Once the second training stage 710 is complete, the method 700 proceeds to an operation 716. The operation 716 comprises outputting, based at least in part on the first training operation 704 and the second training operation 710, a machine learned model, for example machine learned model 200, wherein the machine learned model 200 comprises the decoder 206 in the second configuration. For example, outputting the machine learned model may comprise outputting trained weights and optionally structure information and/or hyperparameters of the machine learning model 600, in particular of the second configuration of the machine learning model 600-2. The weights may be stored in a memory or other computer-readable medium, and/or may be transmitted to a remote system. Referring to FIG. 1, the weights may be stored as, or as part of, neural network data 120 in memory 106 of the computing system 100.

Results

The approach described above was tested using two datasets: emotional speech database (ESD) [12] and multi-view emotional audio-visual data (MEAD) [13]. All the English data in ESD was used, with the total duration around 13.5 hours. A subset of the MEAD containing two emotions (neutral and angry), in total last around 3.5 hours was used. All audio signals were normalized with mono-channel, 16 KHz sampling rate, and maximum magnitude of 1.0. An 80-dimensional Mel-spectrum was extracted with 1024-size sliding Hanning window overlapped at 256 samples, with two folds purpose: (1) as input for style features extraction, (2) as Stage I target. Energy and pitch were extracted at each frame, and the DIO+Stonemask algorithm [14] was employed for pitch extraction. The English transcripts were further converted with ARPABET phonetic transcription [15], before being aligned with the associated audio signal using the Montreal forced aligner (MFA) [7] to obtain the phoneme duration. To avoid out-of-dictionary words, the lexicon dictionary was updated with an English grapheme to phoneme (G2P) package [16]. 3DMM parameters were extracted from the MEAD dataset, using an implementation of [17]. Parameters like rotations, scales, and textures were ignored in the tracking results, and only identities, and blend-shape weights were focused on. Since the audio frame level sampling rate (16 ms) and the video sampling rate 30 fps were inconsistent, spline interpolation was applied in the Stage II training top layer output to align the network output with the video. ESD has pre-defined train-validation-test split, while MEAD was been split with 80-10-10 partitions. Both ESD and MEAD (excluding blendshapes) were used in Stage I training to learn speech style attributes, while only MEAD is used for Stage II training. Adam optimizer with the same learning-rate (LR) scheduler in Vaswani et al. was used for Stage I training, where the LR scheduler was modified for Stage II training with lr=0.01 and warmup steps of 1600. Gradient clip of 1.0 was applied, and mini-batches of 16 sentences were employed in the back propagation.

Figure 10:
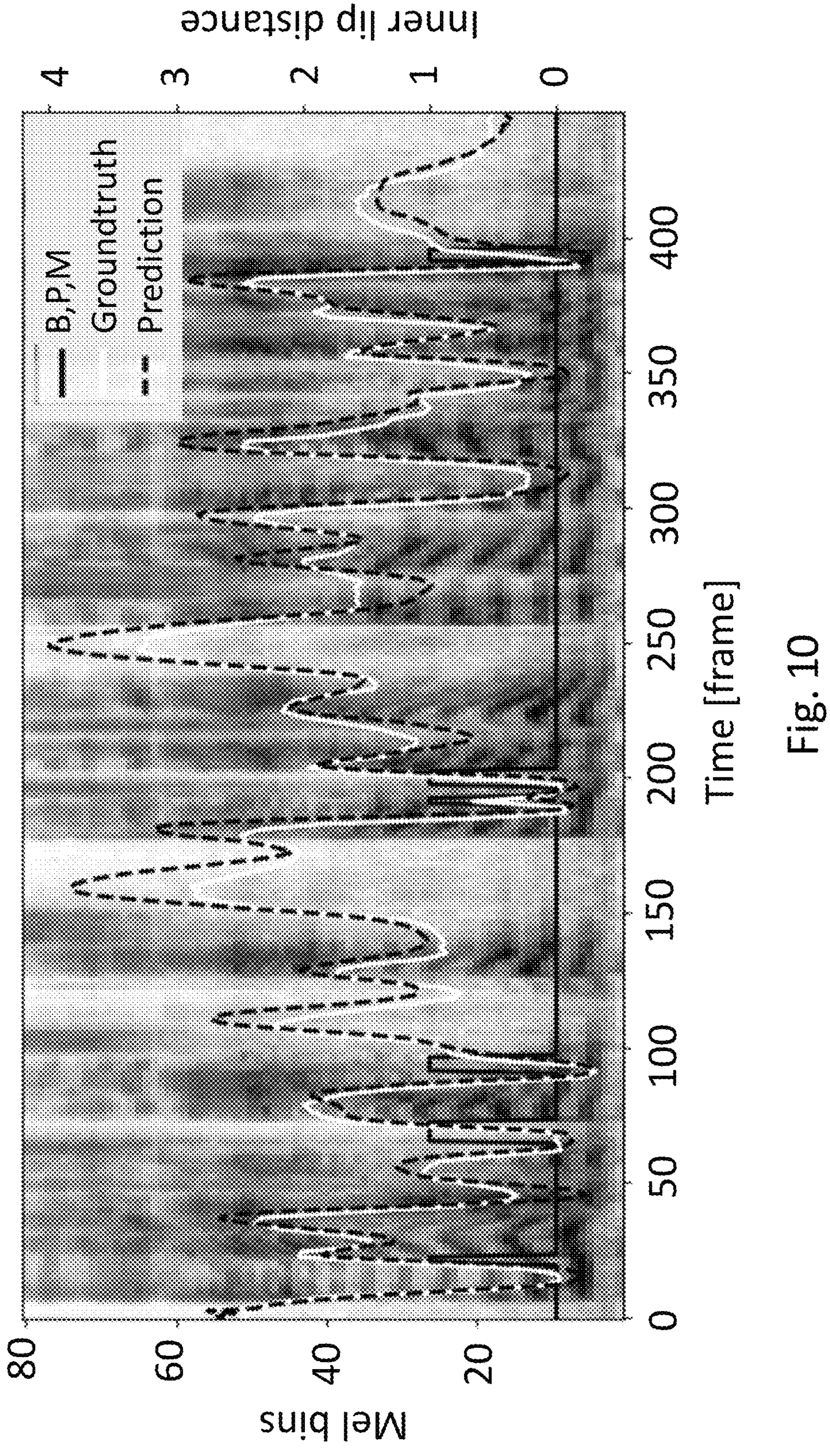
FIG. 10 is a graph that shows example results of a trained model, comparing ground truth to predicted inner lip distance.

Example results are shown in FIG. 10. FIG. 10 illustrates the inner lip distance for a facial representation 116 saying "in many of his poems death comes by train a strongly evocative visual image". As can be seen, there is a good correlation between the ground truth inner lip distance and the inner lip distance of the facial representation 116 output by a model trained as above.

The above embodiments are to be understood as illustrative examples of the invention. Further it is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The following clauses define further statements of invention:

1. A computer-implemented method of generating a facial representation, the method comprising: receiving, at a machine learned model, an input text segment, an input audio signal corresponding to the input text segment, and target style data, wherein the target style data represents a target audio style; generating, by a text encoder of the machine learned model, a representation of the input text segment; determining, by an aligner of the machine learned model, a time alignment between the input text segment and the input audio signal; and generating, by a decoder of the machine learned model, the facial representation based at least in part on the representation of the input text segment, the time alignment, and the target style data, wherein the facial representation comprises a sequence of facial expressions corresponding to the input text segment.
2. The method of clause 1, comprising: receiving, at the machine learned model, a reference audio signal exhibiting the target audio style; and generating, by a style encoder of the machine learned model, the target style data based at least in part on the reference audio signal.
3. The method of any preceding clause, comprising: receiving input video data comprising target footage of a target human face; and generating output video data based at least in part on the input video data and on the facial representation, wherein in the output video data the target human face exhibits the sequence of facial expressions corresponding to the input text segment.
4. The method of any preceding clause, further comprising training the machine learned model, wherein training the machine learned model comprises: performing a first training operation comprising training the model based at least in part on: generating, by a first configuration of the decoder, an output audio representation based on a first training data segment and a corresponding first training audio signal; and updating the machine learning model so as to reduce a deviation between the output audio representation and an audio representation of the first training audio signal; and performing a second training operation comprising training the model based at least in part on: generating, by a second configuration of the decoder, an output facial representation based at least in part on a second training data segment and a corresponding second training audio signal; and updating the machine learning model so as to reduce a deviation between the output facial representation and a training facial representation corresponding to the second training text segment and second training audio signal.
5. The method of clause 4, wherein a weight associated with the text encoder, energy, or pitch is held fixed during the second training operation.
6. The method of clause 4 or clause 5, wherein during the first training operation the model is trained with a first duration of training audio signals, and during the second training operation the model is trained with a second duration of training audio signals, wherein the first duration is at least five times the second duration, or at least ten times the second duration.
7. The method of any preceding clause, wherein generating the time alignment comprises determining, from the input audio signal, a ground truth duration of phonemes represented in the input text segment, and wherein the facial representation is generated based at least in part on the ground truth duration of the phonemes.

8. The method of any preceding clause, wherein the target style data is an embedded representation of the target audio style, and wherein the method further comprises predicting, from the target style data, an energy parameter, a pitch parameter, and a residual parameter.
9. The method of any of clauses 1 to 7, wherein the target style data specifies an energy parameter, a pitch parameter, and a residual parameter.
10. The method of clause 8 or clause 9, wherein the method further comprises generating, by a variance adaptor of the machine learned model, a combined signal representing a combination of the representation of the input text segment, the energy parameter, the pitch parameter, and the residual parameter; and wherein the facial representation is generated by the decoder based at least in part on the combined signal.
11. The method of any preceding clause, wherein the facial representation comprises a blendshape.
12. A computer-implemented method of training a machine learning model for generating a facial representation, the method comprising: initializing the machine learning model, wherein the machine learning model comprises: a text encoder configured to generate, from a received text segment, a representation of the received text segment; an aligner configured to determine a time alignment between the received text segment and a received audio signal corresponding to the received text segment; and a decoder configured to generate an output based at least in part on the representation of the received text segment, the time alignment, and received target style data representing an audio style; performing a first training operation comprising training the machine learning model based at least in part on: generating, by a first configuration of the decoder, an output audio representation based on a first training data segment and a corresponding first training audio signal; and updating the machine learning model so as to reduce a deviation between the output audio representation and an audio representation of the first training audio signal; and performing a second training operation comprising training the model based at least in part on: generating, by a second configuration of the decoder, an output facial representation based at least in part on a second training data segment and a corresponding second training audio signal; and updating the machine learning model so as to reduce a deviation between the output facial representation and a training facial representation corresponding to the second training text segment and second training audio signal; and outputting, based at least in part on the first training operation and the second training operation, a machine learned model, wherein the machine learned model comprises the decoder in the second configuration.
13. A computing system comprising means to carry out the method of any of clauses 1 to 12.
14. One or more storage media storing machine readable instructions which, when executed by one or more processors, cause the one or more processors to carry out the method of any of clauses 1 to 12.
15. A computer program comprising instructions which, when executed by a computer, cause the computer to perform the method of any of clauses 1 to 12.

REFERENCES

The following references, referred to in the text above, are hereby incorporated by reference in their entirety for all purposes:

[1] Daniel Cudeiro, Timo Bolkart, Cassidy Laidlaw, Anurag Ran-jan, and Michael J Black. Capture, learning, and synthesis of 3d speaking styles. In *Proceedings of the IEEE/CVF Conference on Computer Vision and Pattern Recognition*, pages 10101-10111, 2019.

[2] Yingruo Fan, Zhaojiang Lin, Jun Saito, Wenping Wang, and Taku Komura. Faceformer: Speech-driven 3d facial animation with transformers. In *Proceedings of the IEEE/CVF Conference on Computer Vision and Pattern Recognition*, pages 18770-18780, 2022

[3] Tero Karras, Timo Aila, Samuli Laine, Antti Herva, and Jaakko Lehtinen. Audio-driven facial animation by joint end-to-end learning of pose and emotion. *ACM Transactions on Graphics* (TOG), 36 (4): 1-12, 2017

[4] K R Prajwal, Rudrabha Mukhopadhyay, Vinay P Namboodiri, and C V Jawahar. A lip sync expert is all you need for speech to lip generation in the wild. In *Proceedings of the 28th ACM International Conference on Multimedia*, pages 484-492, 2020.

[5] Alexander Richard, Michael Zollho"fer, Yandong Wen, Fer-nando De la Torre, and Yaser Sheikh. Meshtalk: 3d face animation from speech using cross-modality disentanglement. In *Proceedings of the IEEE/CVF International Conference on Computer Vision*, pages 1173-1182, 2021.

[6] Yi Ren, Chenxu Hu, Xu Tan, Tao Qin, Sheng Zhao, Zhou Zhao, and Tie-Yan Liu. Fastspeech 2: Fast and high-quality end-to-end text to speech. *arXiv preprint arXiv:* 2006.04558, 2020.

[7] Michael McAuliffe, Michaela Socolof, Sarah Mihuc, Michael Wagner, and Morgan Sonderegger. Montreal forced aligner: Trainable text-speech alignment using kaldi. In *Interspeech*, volume 2017, pages 498-502, 2017.

[8] Dongchan Min, Dong Bok Lee, Eunho Yang, and Sung Ju Hwang. Meta-stylespeech: Multi-speaker adaptive text-to-speech generation. In *International Conference on Machine Learning*, pages 7748-7759. PMLR, 2021.

[9] Ralph Gross, Iain Matthews, Jeffrey Cohn, Takeo Kanade, and S. Baker. Multi-pie. 12 2013.

[10] Yinghao Aaron Li, Cong Han, and Nima Mesgarani. Styletts: A style-based generative model for natural and diverse text-to-speech synthesis. *arXiv preprint arXiv:* 2205.15439, 2022.

[11] Allam Mousa. Voice conversion using pitch shifting algorithm by time stretching with psola and re-sampling. *Journal of electrical engineering,* 61 (1): 57, 2010.

[12] Kun Zhou, Berrak Sisman, Rui Liu, and Haizhou Li. Emo-tional voice conversion: Theory, databases and esd. *Speech Communication,* 137:1-18, 2022.

[13] Kaisiyuan Wang, Qianyi Wu, Linsen Song, Zhuoqian Yang, Wayne Wu, Chen Qian, Ran He, Yu Qiao, and Chen Change Loy. Mead: A large-scale audio-visual dataset for emotional talking-face generation. In *European Conference on Com-puter Vision*, pages 700-717. Springer, 2020.

[14] Masanori Morise, Fumiya Yokomori, and Kenji Ozawa. World: a vocoder-based high-quality speech synthesis sys-tem for real-time applications. *IEICE TRANSACTIONS on Information and Systems,* 99 (7): 1877-1884, 2016.

[15] Dan Jurafsky and James H Martin. Speech and language processing (3rd draft ed.), 2019.

[16] Kyubyong Park and Jongseok Kim. g2pe. https://github.com/Kyubyong/g2p, 2019.

[17] Ayush Tewari, Michael Zollo"fer, Florian Bernard, Pablo Gar-rido, Hyeongwoo Kim, Patrick Perez, and Christian Theobalt. High-fidelity monocular face reconstruction based on an unsu-pervised model-based face autoencoder. *IEEE Transactions on Pattern Analysis and Machine Intelligence*, pages 1-1, 2018.

[18] Ashish Vaswani, Noam Shazeer, Niki Parmar, Jakob Uszko-reit, Llion Jones, Aidan N Gomez, Łukasz Kaiser, and Illia Polosukhin. Attention is all you need. *Advances in neural information processing systems,* 30, 2017.

[19] Yuxuan Wang, Daisy Stanton, Yu Zhang, R J-Skerry Ryan, Eric Battenberg, Joel Shor, Ying Xiao, Ye Jia, Fei Ren, and Rif A Saurous. Style tokens: Unsupervised style modeling, control and transfer in end-to-end speech synthesis. *arXiv:* 1803.09017.

What is claimed is:

1. A computer-implemented method of generating a facial representation, the method comprising:

receiving, at a machine learned model, an input text segment, an input audio signal corresponding to the input text segment, and target style data, wherein the target style data represents a target audio style;

generating, by a text encoder of the machine learned model, a representation of the input text segment;

determining, by an aligner of the machine learned model, a time alignment between the input text segment and the input audio signal; and generating, by a decoder of the machine learned model, the facial representation based at least in part on the representation of the input text segment, the time alignment, and the target style data, wherein the facial representation comprises a sequence of facial expressions corresponding to the input text segment;

wherein the machine learned model is trained by:

performing a first training operation comprising training the model based at least in part on:

generating, by a first configuration of the decoder, an output audio representation based on a first training text segment and a corresponding first training audio signal; and updating the model so as to reduce a deviation between the output audio representation and an audio representation of the first training audio signal; and performing a second training operation comprising training the model based at least in part on:

generating, by a second configuration of the decoder, an output facial representation based at least in part on a second training text segment and a corresponding second training audio signal; and updating the model so as to reduce a deviation between the output facial representation and a training facial representation corresponding to the second training text segment and second training audio signal.

2. The method of claim 1, comprising:

receiving, at the machine learned model, a reference audio signal exhibiting the target audio style; and generating, by a style encoder of the machine learned model, the target style data based at least in part on the reference audio signal.

3. The method of claim 1, comprising:

receiving input video data comprising target footage of a target human face; and generating output video data based at least in part on the input video data and on the facial representation, wherein in the output video data the target human face exhibits the sequence of facial expressions corresponding to the input text segment.

4. The method of claim 1, wherein a weight associated with the text encoder, energy, or pitch is held fixed during the second training operation.

5. The method of claim 1, wherein during the first training operation the model is trained with a first duration of training audio signals, and during the second training operation the model is trained with a second duration of training audio signals, wherein the first duration is at least five times the second duration, or at least ten times the second duration.

6. The method of claim 1, wherein generating the time alignment comprises determining, from the input audio signal, a ground truth duration of phonemes represented in the input text segment, and wherein the facial representation is generated based at least in part on the ground truth duration of the phonemes.

7. The method of claim 1, wherein the target style data is an embedded representation of the target audio style, and wherein the method further comprises predicting, from the target style data, an energy parameter, a pitch parameter, and a residual parameter.

8. The method of claim 1, wherein the target style data specifies an energy parameter, a pitch parameter, and a residual parameter.

9. The method of claim 7, wherein the method further comprises generating, by a variance adaptor of the machine learned model, a combined signal representing a combination of the representation of the input text segment, the energy parameter, the pitch parameter, and the residual parameter; and wherein the facial representation is generated by the decoder based at least in part on the combined signal.

10. The method of claim 1, wherein the facial representation comprises a blendshape.

11. A computer-implemented method of training a machine learning model for generating a facial representation, the method comprising:

initializing the machine learning model, wherein the machine learning model comprises:

a text encoder configured to generate, from a received text segment, a representation of the received text segment;

an aligner configured to determine a time alignment between the received text segment and a received audio signal corresponding to the received text segment; and a decoder configured to generate an output based at least in part on the representation of the received text segment, the time alignment, and received target style data representing an audio style;

performing a first training operation comprising training the machine learning model based at least in part on:

generating, by a first configuration of the decoder, an output audio representation based on a first training text segment and a corresponding first training audio signal; and updating the machine learning model so as to reduce a deviation between the output audio representation and an audio representation of the first training audio signal; and performing a second training operation comprising training the model based at least in part on:

generating, by a second configuration of the decoder, an output facial representation based at least in part on a second training text segment and a corresponding second training audio signal; and updating the machine learning model so as to reduce a deviation between the output facial representation and a training facial representation corresponding to the second training text segment and second training audio signal; and outputting, based at least in part on the first training operation and the second training operation, a machine learned model, wherein the machine learned model comprises the decoder in the second configuration.

12. A system comprising one or more processors and one or more non-transient storage media storing machine readable instructions which, when executed by the one or more processors, cause the one or more processors to carry out a method comprising:

receiving, at a machine learned model, an input text segment, an input audio signal corresponding to the input text segment, and target style data, wherein the target style data represents a target audio style;

generating, by a text encoder of the machine learned model, a representation of the input text segment;

determining, by an aligner of the machine learned model, a time alignment between the input text segment and the input audio signal; and generating, by a decoder of the machine learned model, the facial representation based at least in part on the representation of the input text segment, the time alignment, and the target style data, wherein the facial representation comprises a sequence of facial expressions corresponding to the input text segment;

wherein the machine learned model is trained by:

performing a first training operation comprising training the model based at least in part on:

generating, by a first configuration of the decoder, an output audio representation based on a first training text segment and a corresponding first training audio signal; and updating the model so as to reduce a deviation between the output audio representation and an audio representation of the first training audio signal; and performing a second training operation comprising training the model based at least in part on:

generating, by a second configuration of the decoder, an output facial representation based at least in part on a second training text segment and a corresponding second training audio signal; and updating the model so as to reduce a deviation between the output facial representation and a training facial representation corresponding to the second training text segment and second training audio signal.

* * * * *